(12) United States Patent
Kaehler et al.

(10) Patent No.: US 11,480,467 B2
(45) Date of Patent: Oct. 25, 2022

(54) AUGMENTED REALITY SYSTEM AND METHOD FOR SPECTROSCOPIC ANALYSIS

(71) Applicant: Magic Leap, Inc., Plantation, FL (US)

(72) Inventors: Adrian Kaehler, Los Angeles, CA (US); Christopher M. Harrises, Nashua, NH (US); Eric Baerenrodt, Milford, NH (US); Mark Baerenrodt, Millbrae, CA (US); Nastasja U. Robaina, Coconut Grove, FL (US); Nicole Elizabeth Samec, Ft. Lauderdale, FL (US); Tammy Sherri Powers, Coral Springs, FL (US); Ivan Li Chuen Yeoh, Tampa, FL (US); Adam Carl Wright, Ft. Lauderdale, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 16/982,426

(22) PCT Filed: Mar. 21, 2019

(86) PCT No.: PCT/US2019/023438
§ 371 (c)(1),
(2) Date: Sep. 18, 2020

(87) PCT Pub. No.: WO2019/183399
PCT Pub. Date: Sep. 26, 2019

(65) Prior Publication Data
US 2021/0080321 A1    Mar. 18, 2021

Related U.S. Application Data

(60) Provisional application No. 62/646,262, filed on Mar. 21, 2018.

(51) Int. Cl.
*G01J 3/46*    (2006.01)
*G01J 3/02*    (2006.01)
(Continued)

(52) U.S. Cl.
CPC ............... *G01J 3/0262* (2013.01); *G01J 3/42* (2013.01); *G01N 21/255* (2013.01); *G01N 21/27* (2013.01);
(Continued)

(58) Field of Classification Search
CPC ........ G01J 3/46; G01J 3/50; G01J 3/02; G01J 3/524; G01J 3/51
(Continued)

(56) References Cited

U.S. PATENT DOCUMENTS 5,377,674 A    1/1995    Kuestner
6,850,221 B1    2/2005    Tickle
(Continued)

FOREIGN PATENT DOCUMENTS

JP    2002-150803 A    5/2002
JP    2003-515759 A    5/2003
(Continued)

OTHER PUBLICATIONS

International Search Report and Written Opinion for PCT Application No. PCT/US 19/23438, dated Jun. 6, 2019.
(Continued)

Primary Examiner — Md M Rahman
(74) Attorney, Agent, or Firm — Seed IP Law Group LLP

(57) ABSTRACT

Wearable spectroscopy systems and methods for identifying one or more characteristics of a target object are described. Spectroscopy systems may include a light source configured to emit light in an irradiated field of view and an electromagnetic radiation detector configured to receive reflected light from a target object irradiated by the light source. One (Continued)

or more processors of the systems may identify a characteristic of the target object based on a determined level of light absorption by the target object. Some systems and methods may include one or more corrections for scattered and/or ambient light such as applying an ambient light correction, passing the reflected light through an anti-scatter grid, or using a time-dependent variation in the emitted light.

20 Claims, 27 Drawing Sheets

(51) Int. Cl.
G01J 3/42 (2006.01)
G01N 21/25 (2006.01)
G01N 21/27 (2006.01)
F21V 8/00 (2006.01)
G02B 27/01 (2006.01)
G06F 3/01 (2006.01)
G09G 5/37 (2006.01)

(52) U.S. Cl.
CPC ....... G02B 6/0076 (2013.01); G02B 27/0172 (2013.01); G06F 3/013 (2013.01); G09G 5/37 (2013.01); G01N 2201/0221 (2013.01); G02B 2027/0134 (2013.01); G09G 2354/00 (2013.01); G09G 2360/144 (2013.01)

(58) Field of Classification Search
USPC ......................................................... 356/402
See application file for complete search history.

(56) References Cited

U.S. PATENT DOCUMENTS

| | | | |
|---|---|---|---|
| 7,286,287 | B1 | 10/2007 | Ofner |
| 8,571,640 | B2* | 10/2013 | Holman ............. A61B 5/02007 600/478 |
| 8,730,266 | B2* | 5/2014 | Brown .................. A61B 3/113 345/633 |
| 9,690,099 | B2* | 6/2017 | Bar-Zeev ............... G06F 3/013 |
| 10,558,047 | B2 | 2/2020 | Samec et al. |
| 11,079,598 | B2 | 8/2021 | Samec et al. |
| 2002/0072658 | A1 | 6/2002 | Rice et al. |
| 2006/0028436 | A1 | 2/2006 | Armstrong |
| 2007/0031291 | A1 | 2/2007 | Piech et al. |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2013/0009993 | A1 | 1/2013 | Horseman |
| 2013/0082922 | A1 | 4/2013 | Miller |
| 2013/0117377 | A1 | 5/2013 | Miller |
| 2013/0125027 | A1 | 5/2013 | Abovitz |
| 2013/0128230 | A1 | 5/2013 | Macnamara |
| 2013/0208234 | A1 | 8/2013 | Lewis |
| 2013/0242262 | A1 | 9/2013 | Lewis |
| 2014/0003762 | A1 | 1/2014 | Macnamara |
| 2014/0046196 | A1* | 2/2014 | Kim ................... A61B 5/02007 600/476 |
| 2014/0071539 | A1 | 3/2014 | Gao |
| 2014/0160432 | A1 | 6/2014 | Brown, Jr. et al. |
| 2014/0177023 | A1 | 6/2014 | Gao et al. |
| 2014/0213865 | A1 | 7/2014 | Kobayashi et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2015/0378159 | A1* | 12/2015 | Lundberg ................ G06F 3/017 345/8 |
| 2016/0011419 | A1 | 1/2016 | Gao |
| 2016/0026253 | A1 | 1/2016 | Bradski et al. |
| 2016/0033771 | A1 | 2/2016 | Tremblay et al. |
| 2016/0116739 | A1 | 4/2016 | Tekolste et al. |
| 2016/0287153 | A1 | 10/2016 | Samec et al. |
| 2017/0010466 | A1* | 1/2017 | Klug ..................... G02B 6/004 |
| 2017/0205903 | A1 | 7/2017 | Miller et al. |
| 2018/0081179 | A1 | 3/2018 | Samec et al. |
| 2022/0026717 | A1 | 1/2022 | Samec et al. |

FOREIGN PATENT DOCUMENTS

| | | | |
|---|---|---|---|
| JP | 2006-139124 A | 6/2006 | |
| KR | 10-2015-0136601 A | 12/2015 | |
| WO | 2014/015378 A1 | 1/2014 | |
| WO | 2015/094191 A1 | 6/2015 | |
| WO | 2015/175681 A1 | 11/2015 | |
| WO | WO-2016048293 A1 * | 3/2016 | ............ G01J 3/0232 |
| WO | 2016/123145 A1 | 8/2016 | |
| WO | 2016/127173 A1 | 8/2016 | |
| WO | 2018/057962 A1 | 3/2018 | |
| WO | WO 2019/183399 | 9/2019 | |

OTHER PUBLICATIONS

International Preliminary Report for Patentability for PCT Application No. PCT/US 19/23438, dated Sep. 22, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Myers, M.J., et al., "LIBS system with compact fiber Spectrometer, head mounted spectra display and hand held eye-safe erbium glass laser gun," Solid State Lasers I: Technology and Devices, vol. 7578, International Society for Optics and Photonics, 2010.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

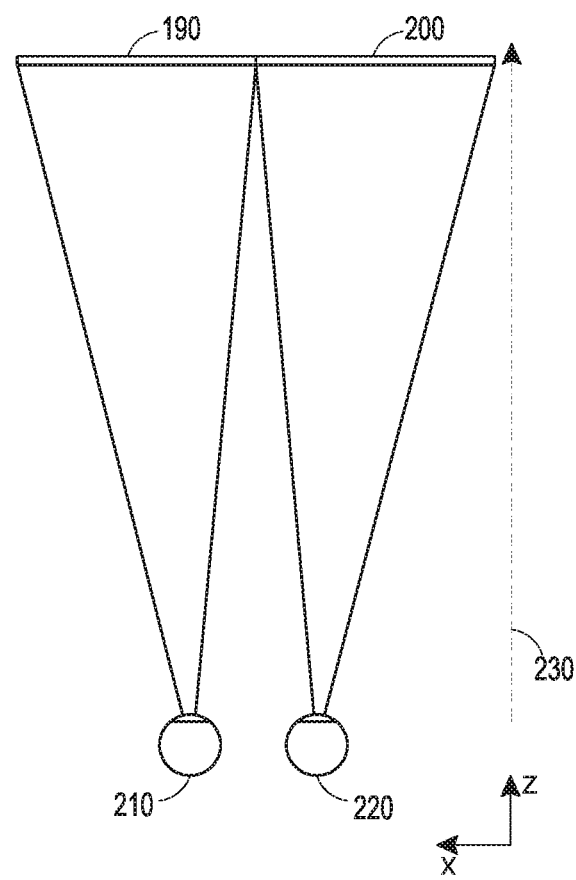
FIG. 1.1

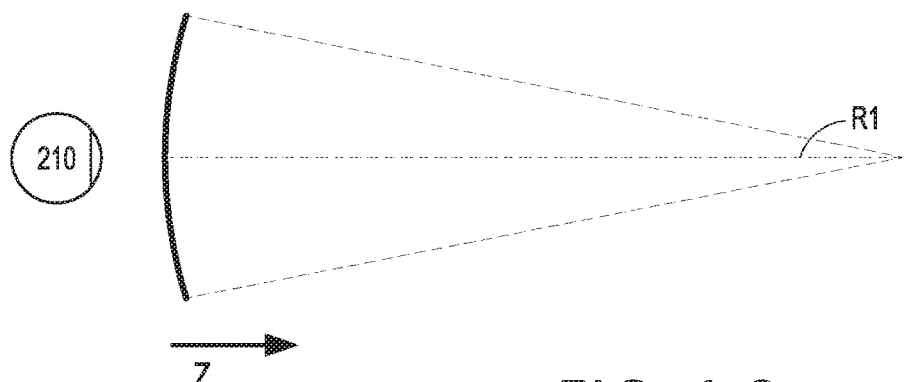
FIG. 1.2
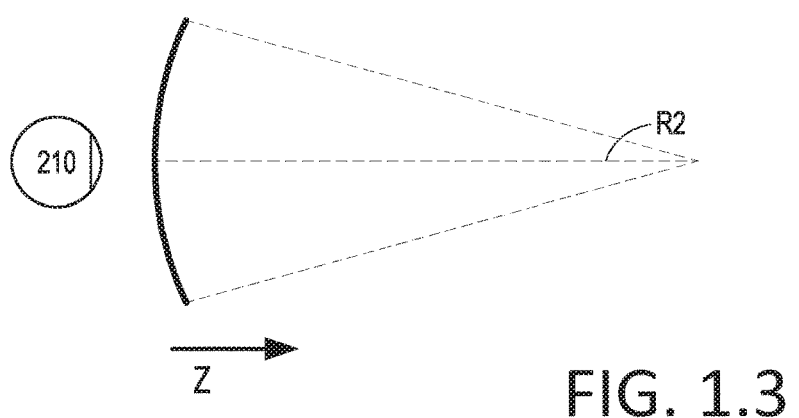
FIG. 1.3
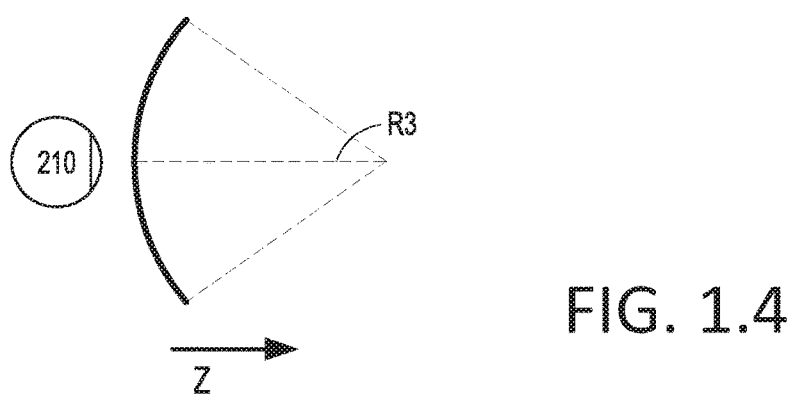
FIG. 1.4

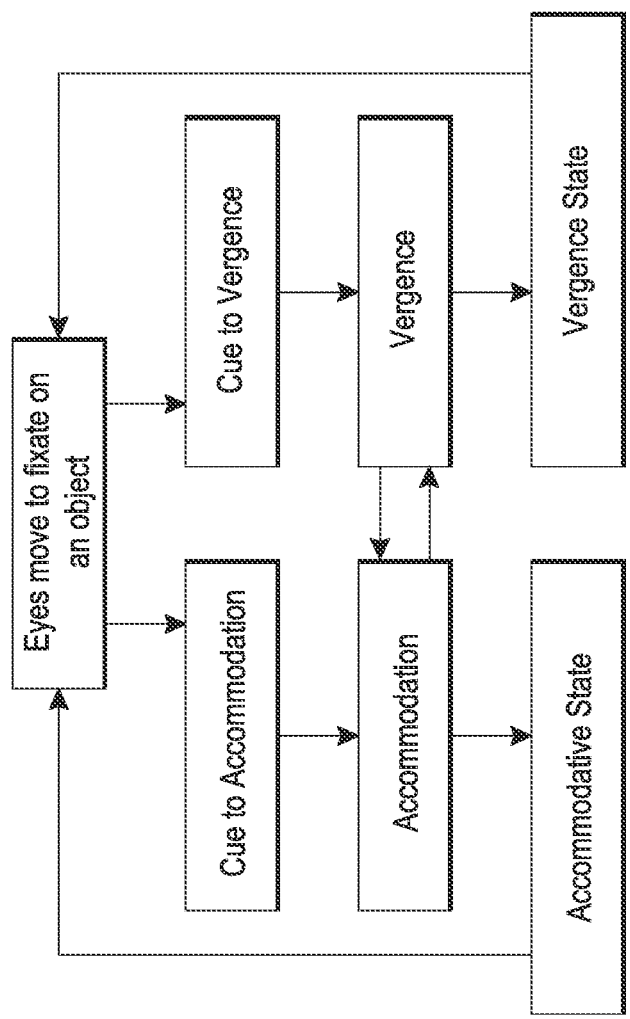
FIG. 1.5

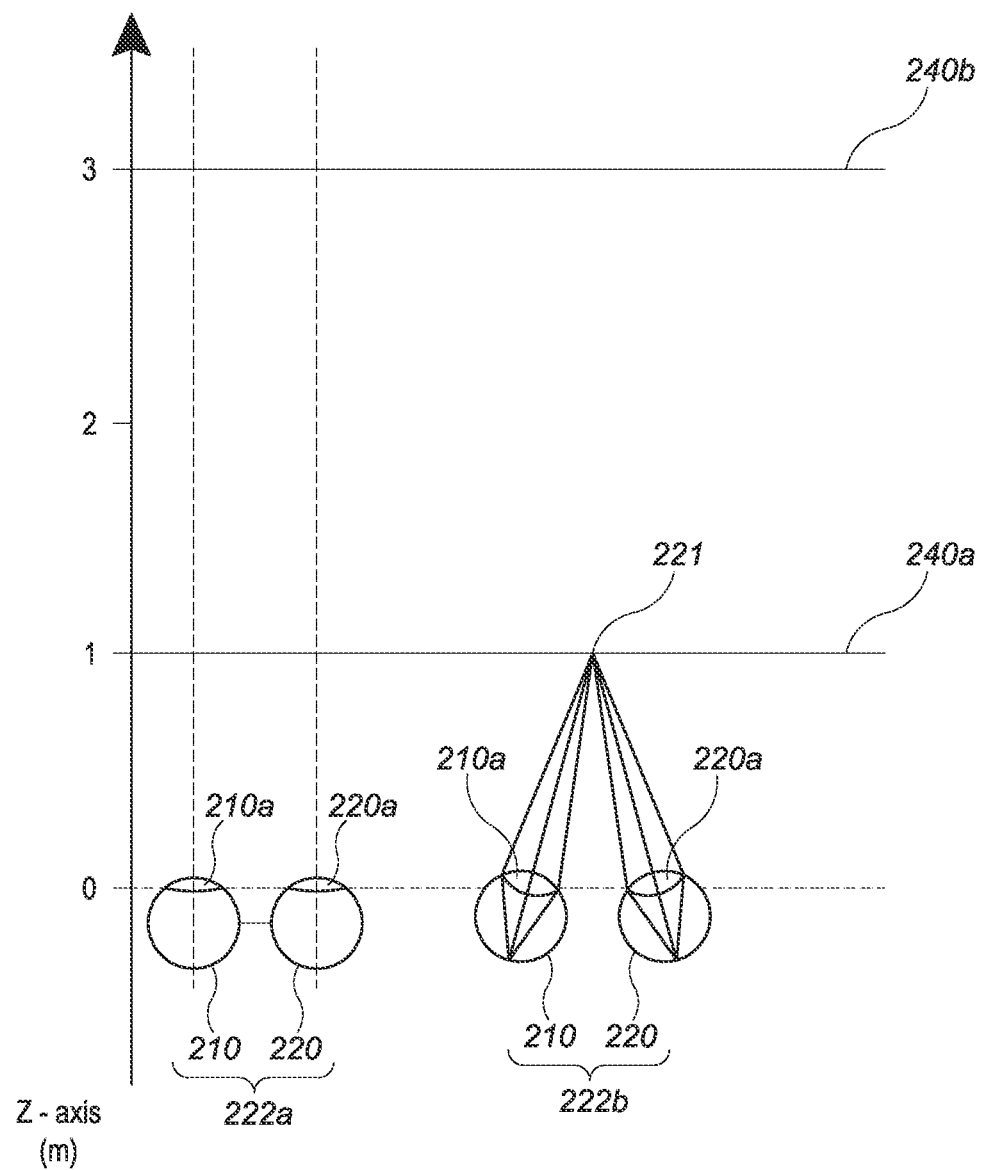
FIG. 1.6

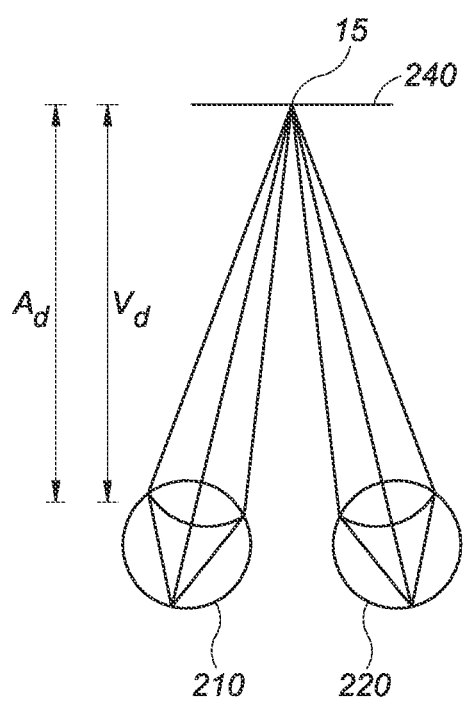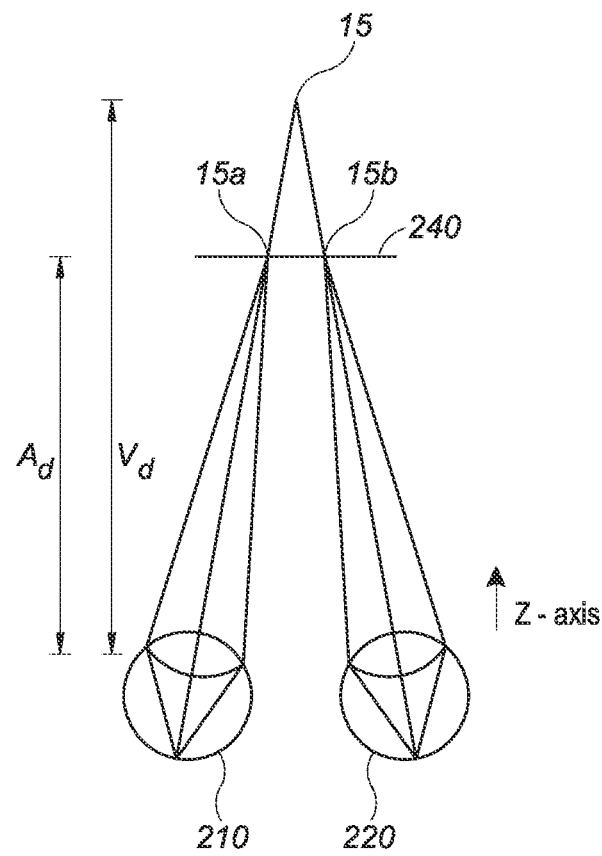
FIG. 1.7    FIG. 1.8

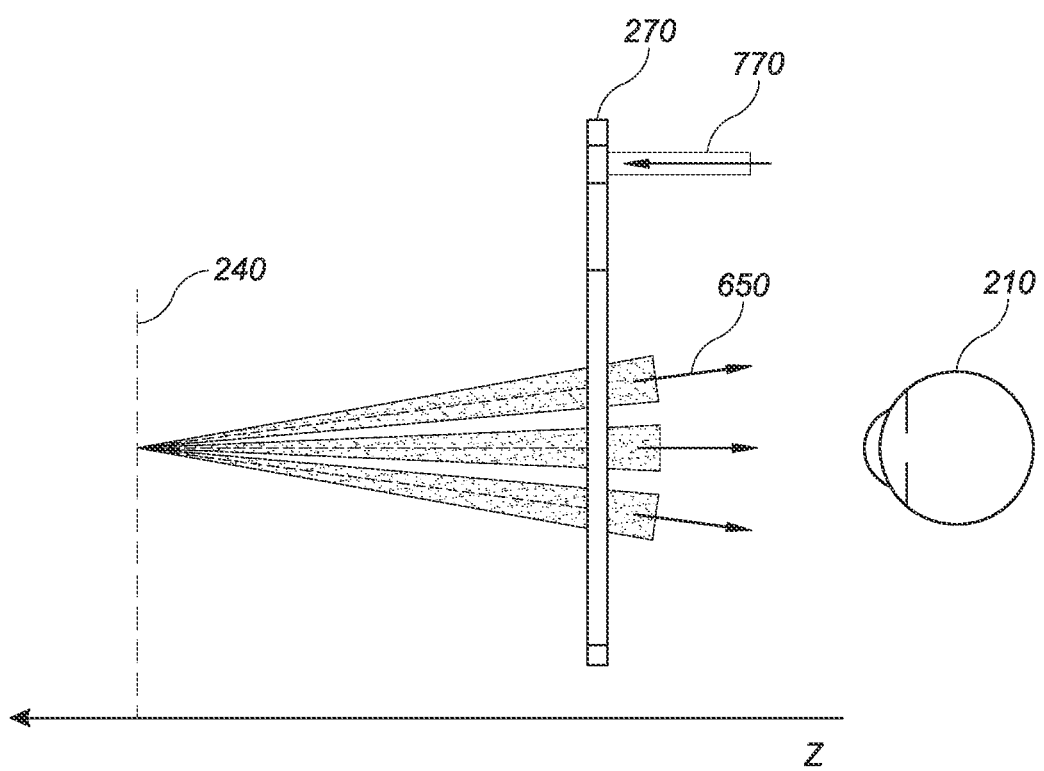
FIG. 1.9

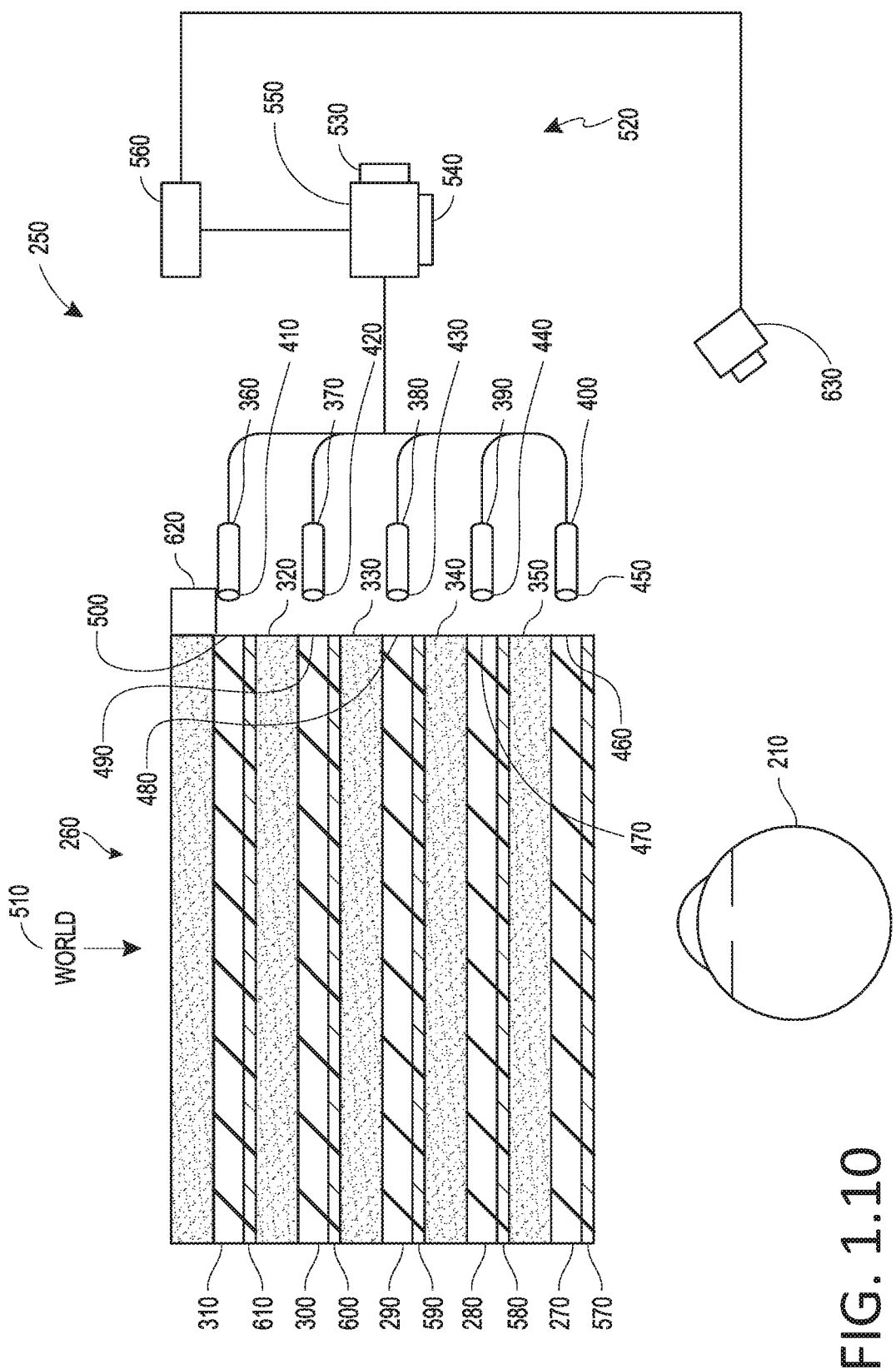
FIG. 1.10

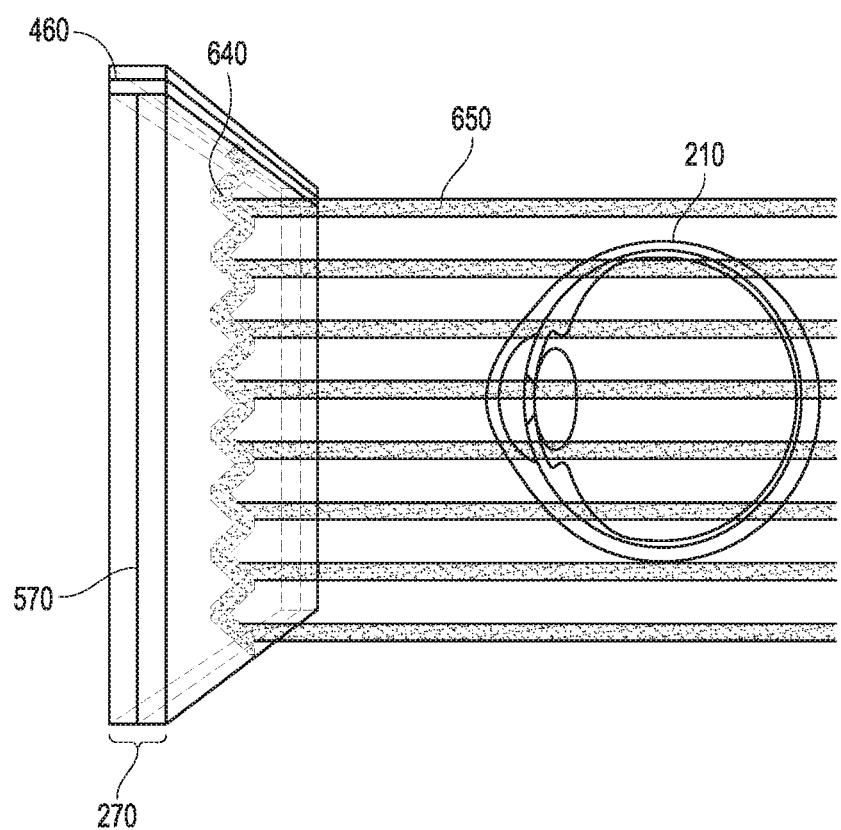
FIG. 1.11

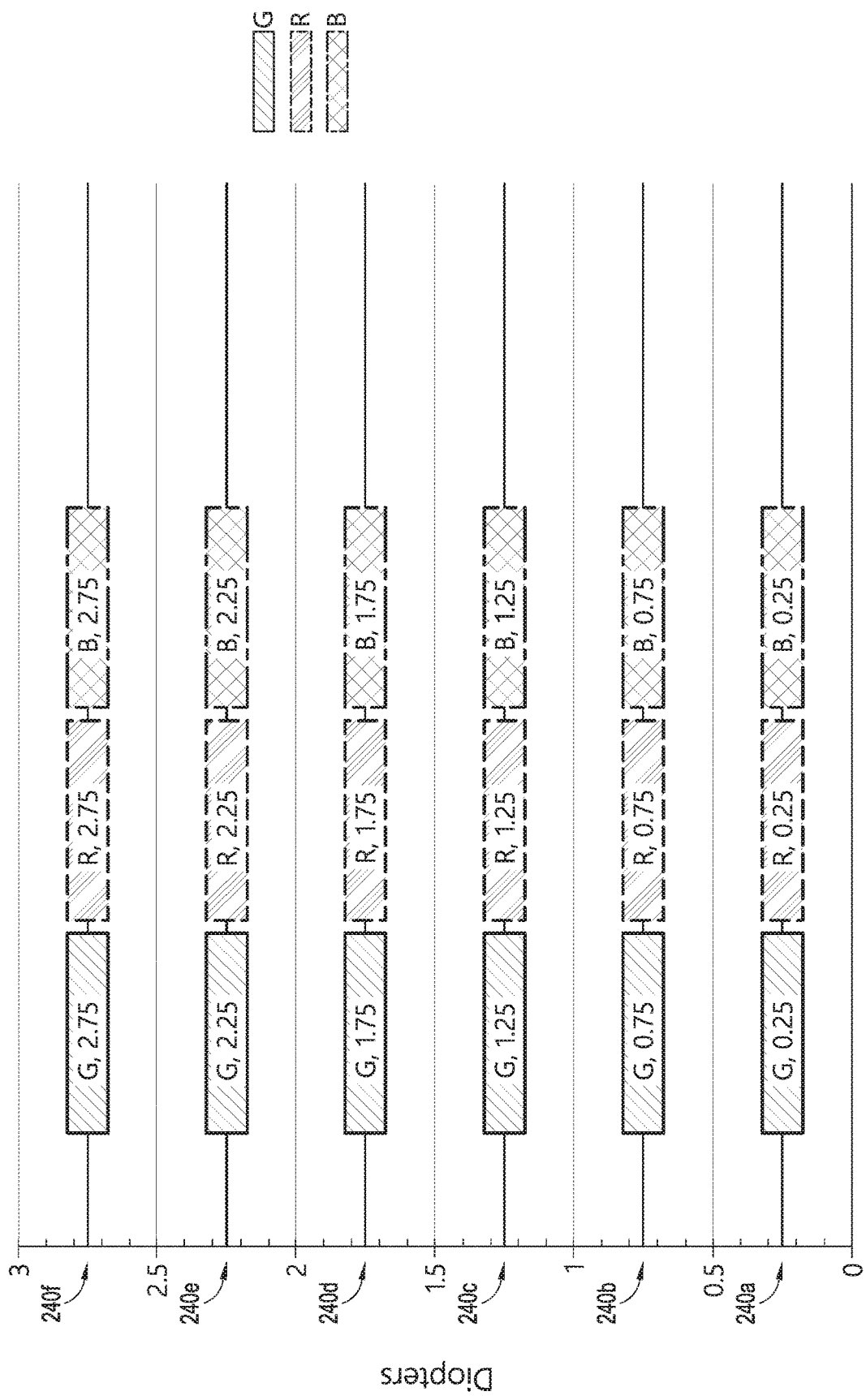
FIG. 1.12

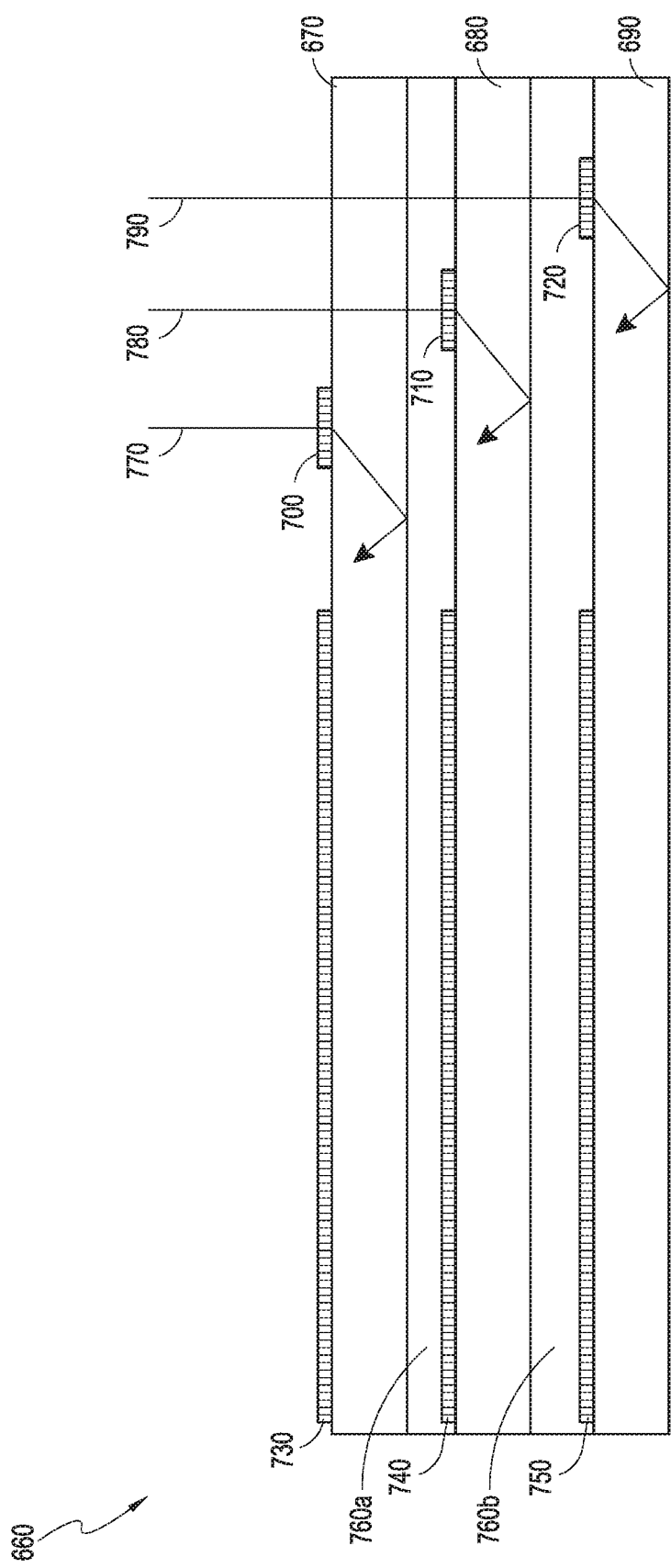
FIG. 1.13

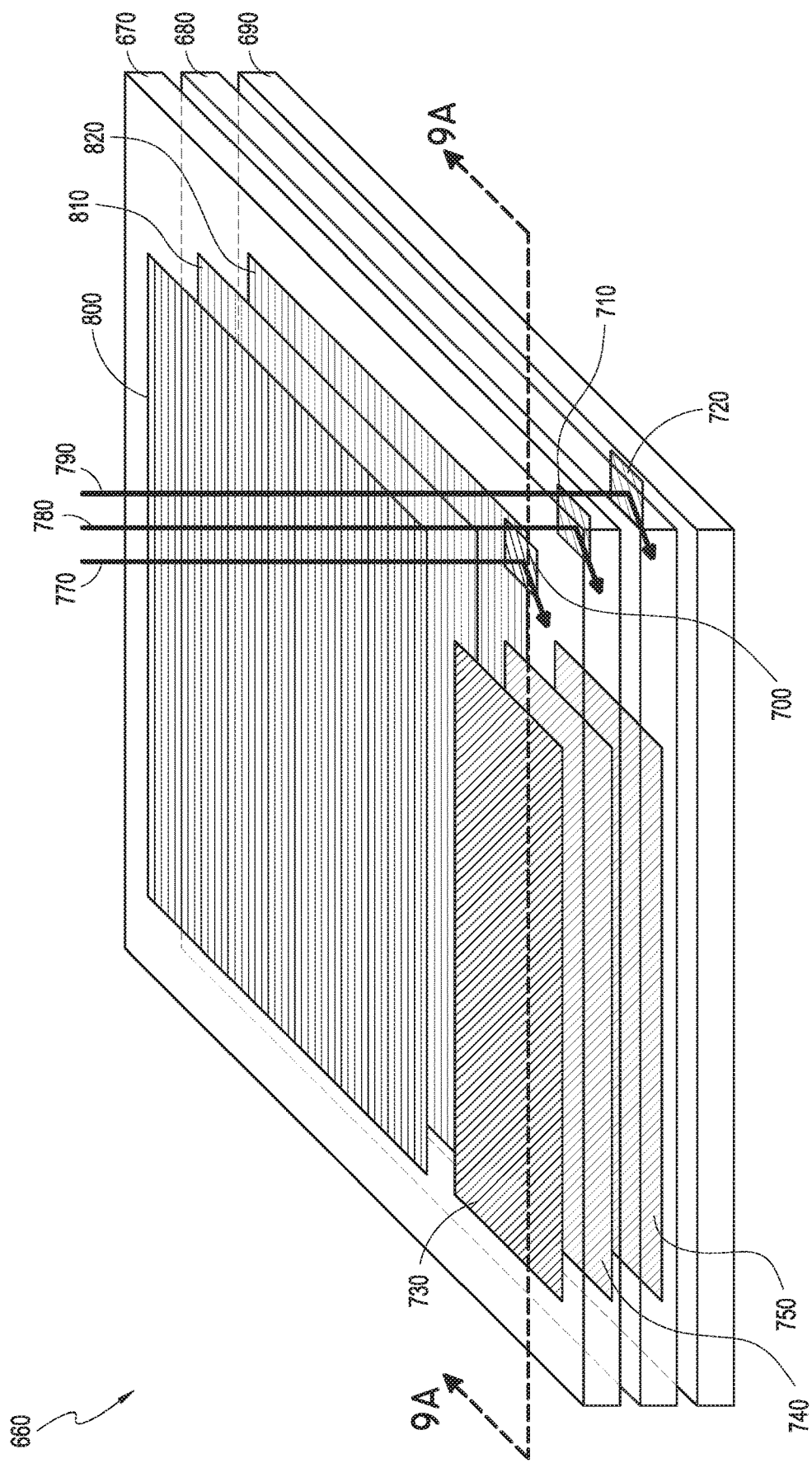
FIG. 1.14

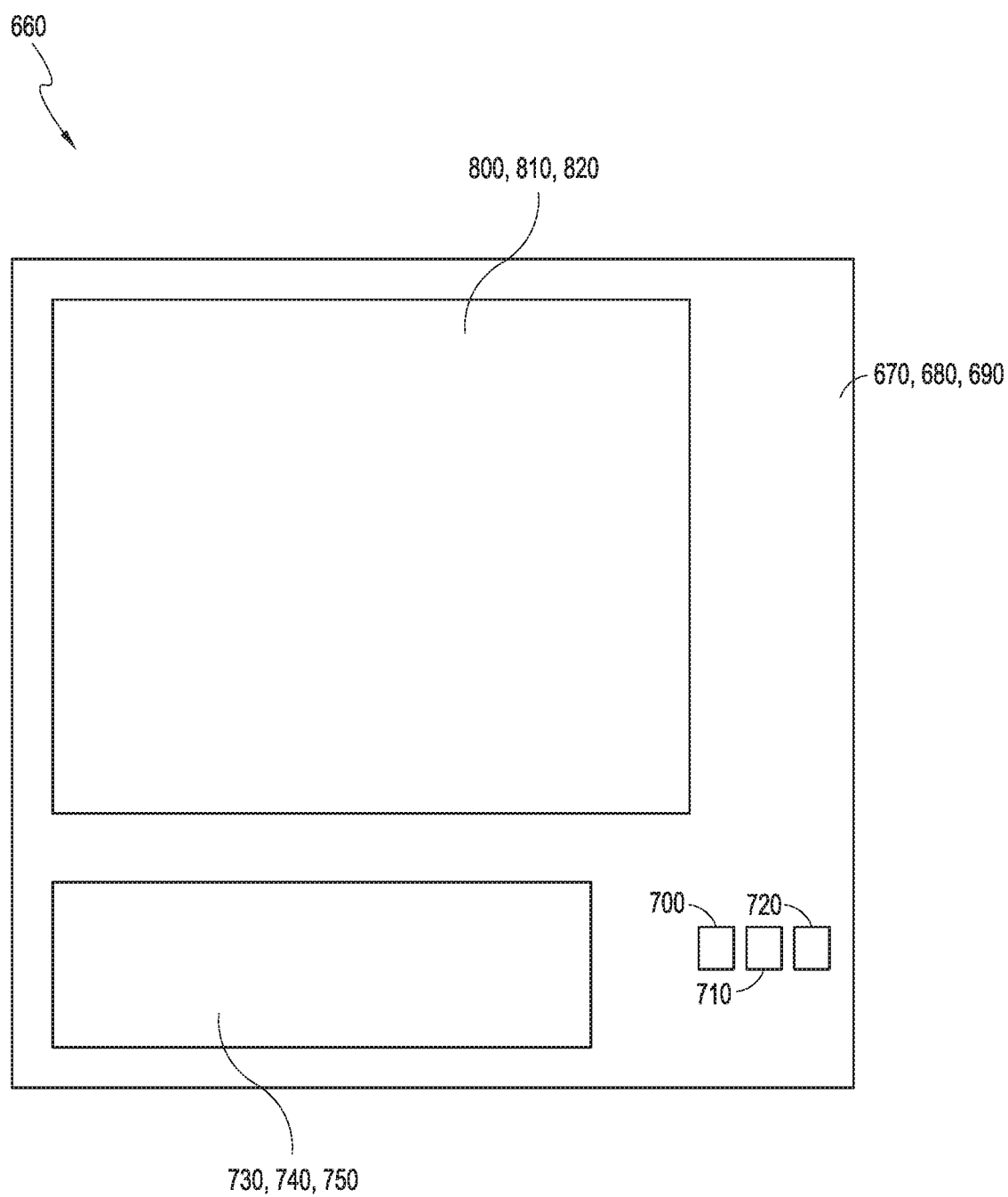
FIG. 1.15

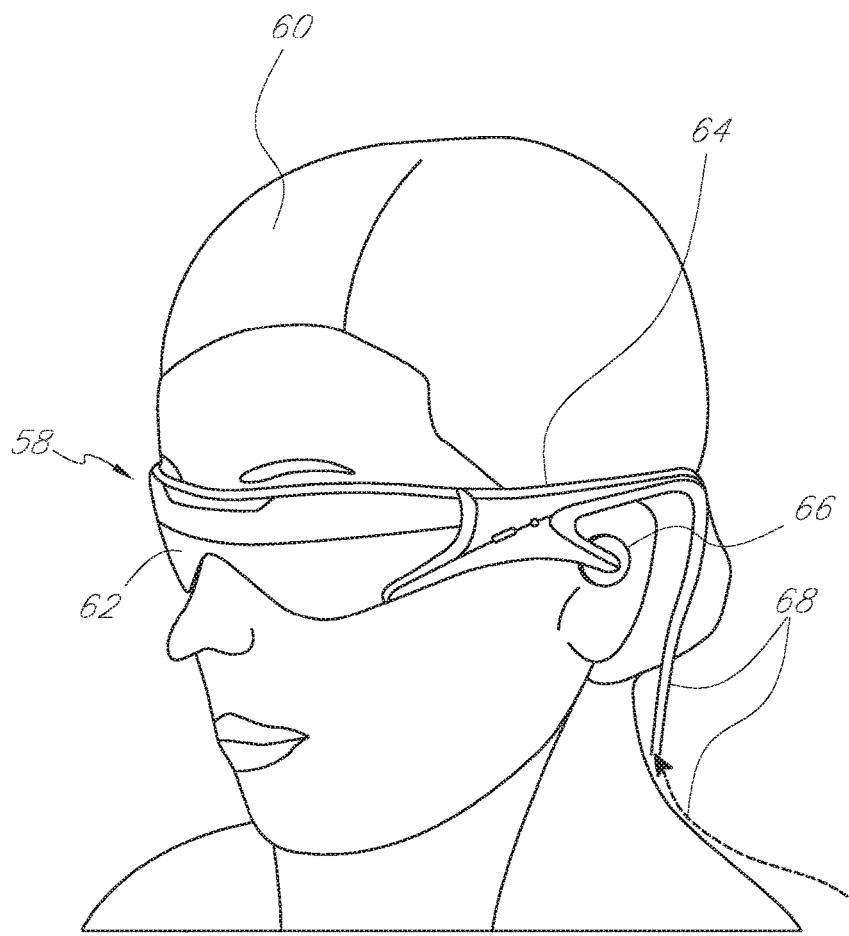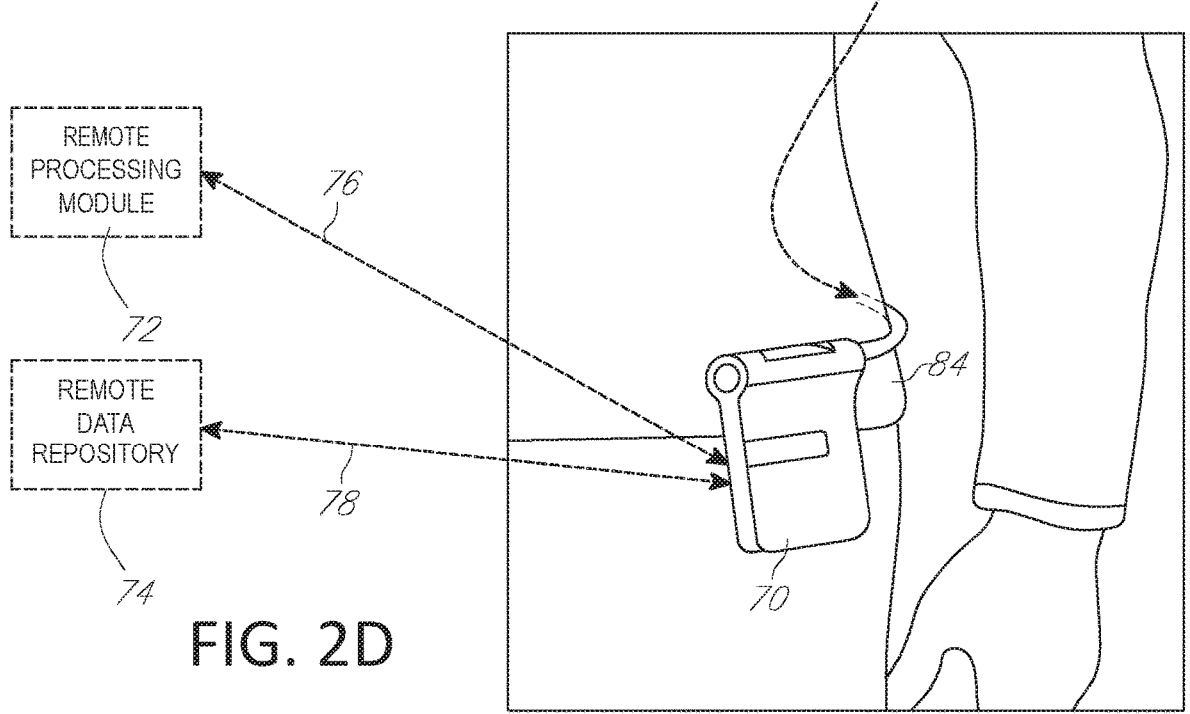
FIG. 2D

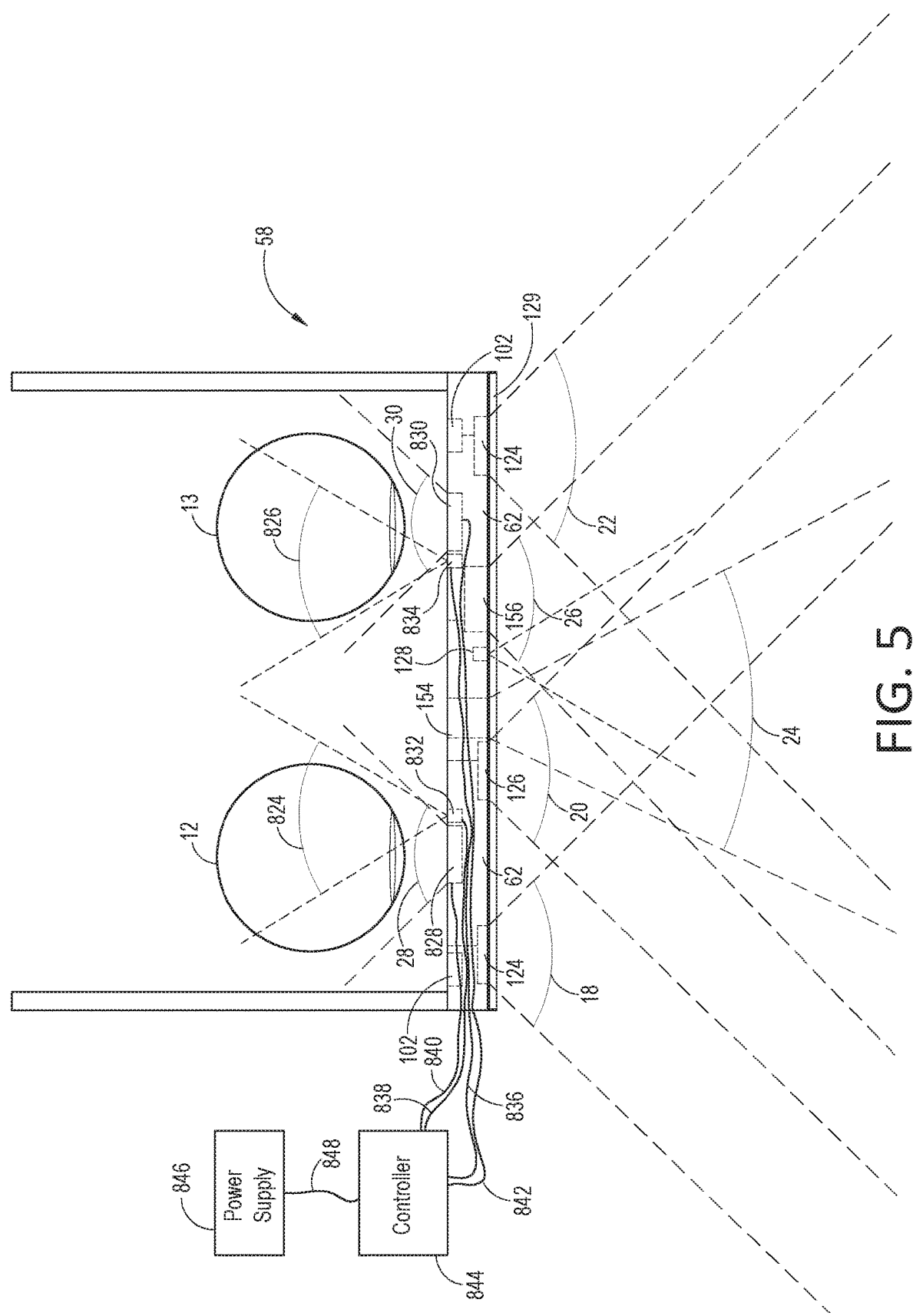

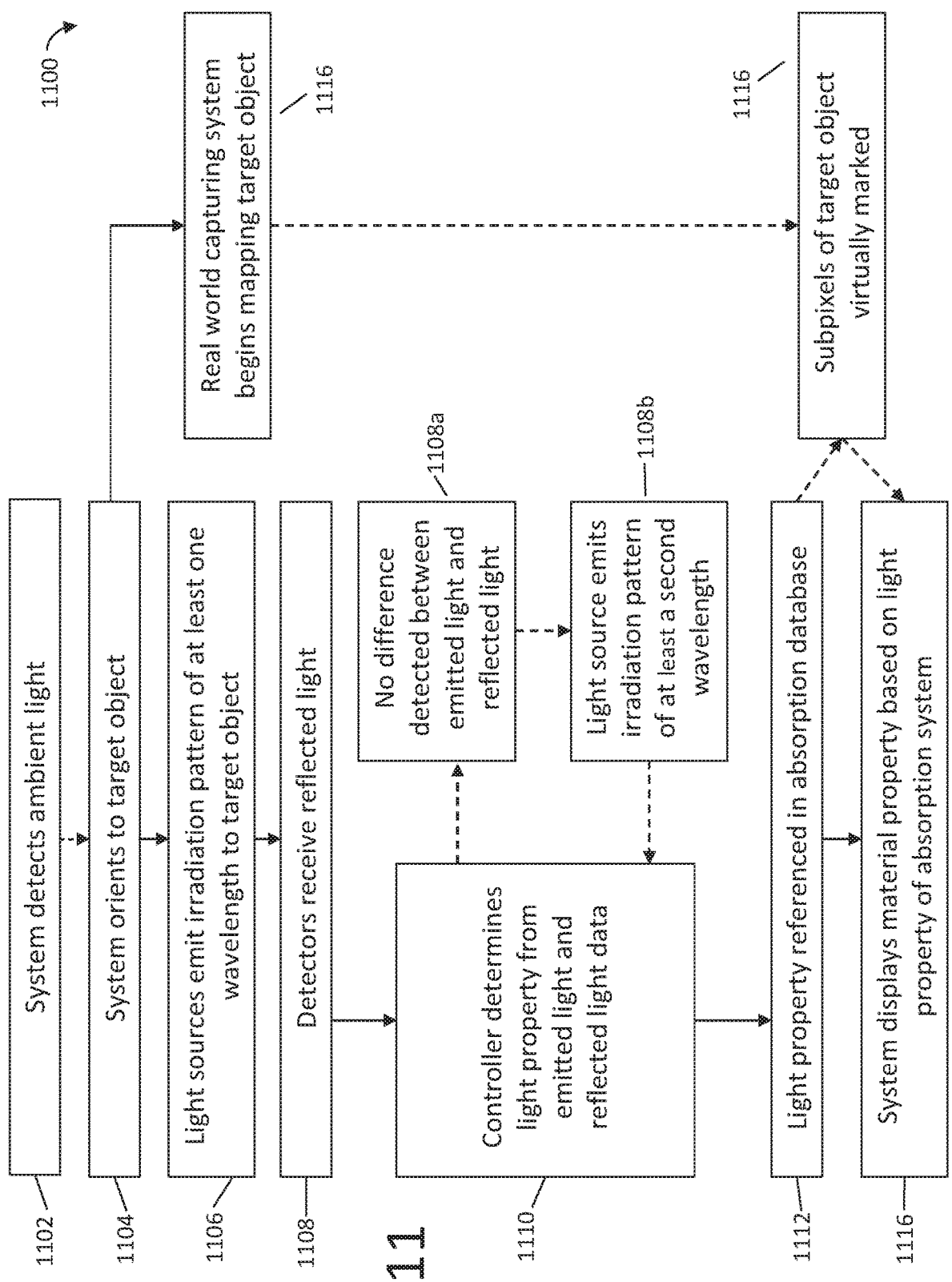

US 11,480,467 B2

AUGMENTED REALITY SYSTEM AND METHOD FOR SPECTROSCOPIC ANALYSIS

PRIORITY CLAIM

This application claims the benefit of U.S. Provisional Application Ser. No. 62/646,262, filed Mar. 21, 2018, entitled AUGMENTED REALITY SYSTEM AND METHOD FOR SPECTROSCOPIC ANALYSIS, the entirety of which is incorporated herein by reference.

INCORPORATION BY REFERENCE

This application incorporates by reference the entireties of each of the following US patent applications: U.S. patent application Ser. No. 15/072,341; U.S. patent application Ser. No. 14/690,401; U.S. patent application Ser. No. 14/555,858; U.S. application Ser. No. 14/555,585; U.S. patent application Ser. No. 13/663,466; U.S. patent application Ser. No. 13/684,489; U.S. patent application Ser. No. 14/205,126; U.S. patent application Ser. No. 14/641,376; U.S. patent application Ser. No. 14/212,961; U.S. Provisional Patent Application No. 62/298,993 (corresponding to U.S. patent application Ser. No. 15/425,837); U.S. patent application Ser. No. 15/425,837; and U.S. Provisional Patent Application No. 62/642,761.

BACKGROUND

Field

The present disclosure relates to systems and methods for augmented reality using wearable componentry, and more specifically to configurations of augmented reality systems for identifying material by reflective light properties.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; and an augmented reality or "AR" scenario typically involves presentation of digital or virtual image information as an augmentation to visualization of the actual world around the user while still permitting the user to substantially perceive and view the real world.

For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging. For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account. Certain aspects of suitable AR systems are disclosed, for example, in U.S. patent application Ser. No. 14/205,126, entitled "System and method for augmented and virtual reality," which is incorporated by reference in its entirety herein, along with the following additional disclosures, which relate to augmented and virtual reality systems such as those developed by Magic Leap, Inc. of Fort Lauderdale, Fla.: U.S. patent application Ser. No. 14/641,376; U.S. patent application Ser. No. 14/555,585; U.S. patent application Ser. No. 14/212,961; U.S. patent application Ser. No. 14/690,401; U.S. patent application Ser. No. 13/663,466; U.S. patent application Ser. No. 13/684,489; and U.S. Patent Application Ser. No. 62/298,993, each of which is incorporated by reference herein in its entirety.

Systems and methods disclosed herein address various challenges and developments related to AR and VR technology.

SUMMARY

Various implementations of methods and apparatus within the scope of the appended claims each have several aspects, no single one of which is solely responsible for the desirable attributes described herein. Without limiting the scope of the appended claims, some prominent features are described herein.

In some embodiments, a wearable spectroscopy system is provided. The wearable spectroscopy system comprises a head-mounted display system removably mountable on a user's head, one or more light sources coupled to the head-mounted display system and configured to emit light in an irradiated field of view, one or more electromagnetic radiation detectors coupled to the head-mounted display system and configured to receive reflected light from a target object irradiated by the one or more light sources within the irradiated field of view, one or more processors, and one or more computer storage media. The one or more computer storage media store instructions that, when executed by the one or more processors, cause the system to perform operations comprising causing the one or more light sources to emit light, causing the one or more electromagnetic radiation detectors to detect light from the irradiated field of view including the target object, determining an ambient light correction by detecting ambient light levels, applying the ambient light correction to the detected light to determine levels of light absorption related to the emitted light and reflected light from the target object, identifying, based on the levels of light absorption, a characteristic of the target object, and displaying the identified characteristic to the user on the head-mounted display system.

In some embodiments, a wearable spectroscopy system is provided. The wearable spectroscopy system comprises a head-mounted display removably mountable on a user's head, one or more light sources coupled to the head-mounted display system and configured to emit light in an irradiated field of view, one or more electromagnetic radiation detectors coupled to the head-mounted display system and configured to receive reflected light from a target object irradiated by the one or more light sources within the irradiated field of view, an anti-scatter grid disposed between the electromagnetic radiation detector and the target object, the anti-scatter grid configured to attenuate at least one of scattered light and ambient light incident thereon, one or more processors, and one or more computer storage media. The one or more computer storage media store instructions that, when executed by the one or more processors, cause the system to perform operations comprising emitting, from the one or more light sources, light of a first wavelength in an irradiated field of view, detecting, at the one or more electromagnetic radiation detectors, light of the first wavelength reflected from a target object within the irradiated field of view, identifying, based on an absorption database of light absorption properties of at least one material, a material characteristic of the target object, and causing a graphics processor unit to display, to the user, an output associated with the material characteristic.

In some embodiments, a wearable spectroscopy system is provided. The wearable spectroscopy system comprises a head-mounted display removably mountable on a user's head, one or more light sources coupled to the head-mounted display system and configured to emit light in an irradiated field of view, one or more electromagnetic radiation detectors coupled to the head-mounted display system and configured to receive reflected light from a target object irradiated by the one or more light sources within the irradiated field of view, one or more processors, and one or more computer storage media. The one or more computer storage media store instructions that, when executed by the one or more processors, cause the system to perform operations comprising detecting ambient light of a first wavelength within the irradiated field of view, emitting light of the first wavelength toward the target object, detecting light of the first wavelength reflected by the target object, subtracting an intensity of the detected ambient light of the first wavelength from an intensity of the detected light reflected by the target object to calculate a level of light absorption related to the emitted light and the reflected light from the target object, identifying, based on an absorption database of light absorption properties of a plurality of materials, a material characteristic of the target object, and displaying, to the user, an output associated with the material characteristic.

In some embodiments, a wearable spectroscopy system is provided. The wearable spectroscopy system comprises a head-mounted display removably mountable on a user's head, one or more light sources coupled to the head-mounted display system and configured to emit light in an irradiated field of view, one or more electromagnetic radiation detectors coupled to the head-mounted display system and configured to receive reflected light from a target object irradiated by the one or more light sources within the irradiated field of view, one or more processors, and one or more computer storage media. The one or more computer storage media store instructions that, when executed by the one or more processors, cause the system to perform operations comprising emitting light of a first wavelength in an irradiated field of view, the light comprising a time-encoded variation, detecting light of the first wavelength reflected from a target object within the irradiated field of view, identifying, based at least in part on the detected light and the time-encoded variation, an ambient light component of the detected light and a reflected component of the detected light, identifying, based at least in part on the reflected component and an absorption database of light absorption properties of at least one material, a material characteristic of the target object, and displaying, to the user, an output associated with the material characteristic.

Addition examples of embodiments are provide below.

1. A wearable spectroscopy system comprising:
   a head-mounted display system removably mountable on a user's head;
   one or more light sources coupled to the head-mounted display system and configured to emit light in an irradiated field of view;
   one or more electromagnetic radiation detectors coupled to the head-mounted display system and configured to receive reflected light from a target object irradiated by the one or more light sources within the irradiated field of view;
   one or more processors; and
   one or more computer storage media storing instructions that, when executed by the one or more processors, cause the system to perform operations comprising:
      causing the one or more light sources to emit light;
      causing the one or more electromagnetic radiation detectors to detect light from the irradiated field of view including the target object;
      determining an ambient light correction by detecting ambient light levels;
      applying the ambient light correction to the detected light to determine levels of light absorption related to the emitted light and reflected light from the target object;
      identifying, based on the levels of light absorption, a characteristic of the target object; and
      displaying an output associated with the characteristic of the target object to the user on the head-mounted display system.

2. The system of example 1, further comprising an absorption database of light absorption properties of a plurality of materials.

3. The system of example 1, wherein the ambient light correction comprises one or more of: an ambient light intensity value, an average of a plurality of ambient light intensity values, a median of a plurality of ambient light intensity values, and a time-domain ambient light intensity function.

4. The system of example 1, further comprising at least one eye tracking camera configured to detect a gaze of the user, wherein the irradiated field of view is substantially in the same direction as the detected gaze.

5. The system of example 1, wherein the one or more electromagnetic radiation detectors are further configured to detect the ambient light levels.

6. The system of example 1, further comprising an ambient light detector coupled to the head-mounted display system and configured to capture ambient light not emitted by the one or more light sources, the ambient light including one or more wavelengths emitted by the one or more light sources.

7. The system of example 6, wherein the ambient light detector comprises at least one of a photodiode, a photodetector, and a digital camera sensor.

8. The system of example 6, wherein the instructions, when executed by the one or more processors, further cause system to perform operations comprising:
   causing the ambient light detector to detect light while the one or more light sources are not emitting light; and
   determining the ambient light correction based at least in part on the light detected by the ambient light detector.

9. The system of example 1, further comprising an anti-scatter grid coupled to the head-mounted display system between the target object and the one or more electromagnetic radiation detectors, the anti-scatter grid aligned to attenuate at least a portion of scattered light and ambient light incident upon the anti-scatter grid.

10. The system of example 9, wherein the anti-scatter grid is further disposed between the target object and a detector for detecting ambient light levels.

11. The system of example 1, wherein the one or more light sources are configured to emit the light in a series of time-separated pulses, and wherein the instructions, when executed by the one or more processors, further cause the system to perform operations comprising:
identifying time-separated pulses of reflected light corresponding to the time-separated pulses emitted by the one or more light sources; and
determine the ambient light correction based at least in part on an intensity of light detected at the one or more electromagnetic radiation detectors between the time-separated pulses of reflected light.

12. The system of example 11, wherein the time-separated pulses of reflected light are detected at the one or more electromagnetic radiation detectors.

13. The system of example 1, wherein the one or more electromagnetic radiation detectors comprises at least one of a photodiode and a photodetector.

14. The system of example 1, wherein the one or more electromagnetic radiation detectors comprises a digital image sensor.

15. The system of example 1, wherein the head-mounted member further comprises an inertial measurement unit positional system.

16. The system of example 15, wherein the inertial measurement systems determines a pose orientation of the user's head.

17. The system of example 16, wherein the irradiated field of view is at least as wide as the pose orientation.

18. The system of example 1, wherein the head-mounted display system comprises a waveguide stack configured to output light with selectively variable levels of wavefront divergence.

19. The system of example 18, wherein the waveguide stack comprises waveguides having optical power.

20. A wearable spectroscopy system comprising:
a head-mounted display removably mountable on a user's head;
one or more light sources coupled to the head-mounted display system and configured to emit light in an irradiated field of view;
one or more electromagnetic radiation detectors coupled to the head-mounted display system and configured to receive reflected light from a target object irradiated by the one or more light sources within the irradiated field of view;
an anti-scatter grid disposed between the electromagnetic radiation detector and the target object, the anti-scatter grid configured to attenuate at least one of scattered light and ambient light incident thereon;
one or more processors; and
one or more computer storage media storing instructions that, when executed by the one or more processors, cause the system to perform operations comprising:
emitting, from the one or more light sources, light of a first wavelength in an irradiated field of view;
detecting, at the one or more electromagnetic radiation detectors, light of the first wavelength reflected from a target object within the irradiated field of view;
identifying, based on an absorption database of light absorption properties of at least one material, a material characteristic of the target object; and
causing a graphics processor unit to display, to the user, an output associated with the material characteristic.

21. The system of example 20, wherein the instructions, when executed by the one or more processors, further cause the system to perform operations comprising:
detecting an intensity of ambient light at the first wavelength; and
determining an ambient light-corrected intensity of reflected light by subtracting the intensity of ambient light from an intensity of the light of the first wavelength detected at the electromagnetic radiation detector,
wherein the material characteristic of the target object is identified based at least in part on the ambient light-corrected intensity.

22. The system of example 21, wherein the intensity of ambient light at the first wavelength is detected while the light source is not emitting light.

23. The system of example 20, wherein the instructions, when executed by the one or more processors, further cause the system to perform operations comprising:
detecting a plurality of intensities of ambient light at the first wavelength; and
determining an ambient light-corrected intensity of reflected light by subtracting, from an intensity of the light detected at the electromagnetic radiation detector, one of: an average of the plurality of intensities of ambient light, a median of the plurality of intensities of ambient light, and a time-domain ambient light intensity function corresponding to the plurality of intensities of ambient light,
wherein the material characteristic of the target object is identified based at least in part on the ambient light-corrected intensity.

24. The system of example 23, wherein the plurality of intensities of ambient light at the first wavelength are detected while the light source is not emitting light.

25. The system of example 20, wherein the light of the first wavelength is emitted in a series of time-separated pulses, and wherein the instructions, when executed by the one or more processors, further cause the system to perform operations comprising:
identifying an ambient light component of the detected light based on recognizing the time-separated pulses in the detected light; and
determining an ambient light-corrected intensity of reflected light by subtracting the ambient light component from an intensity of the time-separated pulses in the detected light,
wherein the material characteristic of the target object is identified based at least in part on the ambient light-corrected intensity.

26. A wearable spectroscopy system comprising:
a head-mounted display removably mountable on a user's head;
one or more light sources coupled to the head-mounted display system and configured to emit light in an irradiated field of view;
one or more electromagnetic radiation detectors coupled to the head-mounted display system and configured to receive reflected light from a target object irradiated by the one or more light sources within the irradiated field of view;
one or more processors; and
one or more computer storage media storing instructions that, when executed by the one or more processors, cause the system to perform operations comprising:
detecting ambient light of a first wavelength within the irradiated field of view;

emitting light of the first wavelength toward the target object;

detecting light of the first wavelength reflected by the target object;

subtracting an intensity of the detected ambient light of the first wavelength from an intensity of the detected light reflected by the target object to calculate a level of light absorption related to the emitted light and the reflected light from the target object;

identifying, based on an absorption database of light absorption properties of a plurality of materials, a material characteristic of the target object; and displaying, to the user, an output associated with the material characteristic.

27. The system of example 26, wherein the ambient light is detected at a time when the light source is not emitting light.

28. The system of example 26, wherein detecting the ambient light comprises detecting an intensity of the ambient light at a plurality of times and calculating an average ambient light intensity or a median ambient light intensity.

29. The system of example 26, wherein detecting the ambient light comprises detecting an intensity of the ambient light at a plurality of times and calculating a time-domain ambient light intensity function, and wherein the intensity of ambient light subtracted from the intensity of the detected light is determined based at least in part on the time-domain ambient light intensity function.

30. The system of example 26, further comprising an ambient light detector, the ambient light detector comprising one or more of a photodiode, a photodetector, and a digital camera sensor.

31. A wearable spectroscopy system comprising:

a head-mounted display removably mountable on a user's head;

one or more light sources coupled to the head-mounted display system and configured to emit light in an irradiated field of view;

one or more electromagnetic radiation detectors coupled to the head-mounted display system and configured to receive reflected light from a target object irradiated by the one or more light sources within the irradiated field of view;

one or more processors; and one or more computer storage media storing instructions that, when executed by the one or more processors, cause the system to perform operations comprising:

emitting light of a first wavelength in an irradiated field of view, the light comprising a time-encoded variation;

detecting light of the first wavelength reflected from a target object within the irradiated field of view;

identifying, based at least in part on the detected light and the time-encoded variation, an ambient light component of the detected light and a reflected component of the detected light;

identifying, based at least in part on the reflected component and an absorption database of light absorption properties of at least one material, a material characteristic of the target object; and displaying, to the user, an output associated with the material characteristic.

32. The system of example 31, wherein the time-encoded variation comprises a plurality of time-separated pulses of the light of the first wavelength, and wherein identifying the ambient light component and the reflected component comprises identifying time-separated pulses in the detected light corresponding to the time-separated pulses of the emitted light.

33. The system of example 32, wherein identifying the ambient light component and the reflected component further comprises:

measuring an intensity of detected light at a time between two of the time-separated pulses in the detected light; and subtracting the measured intensity from a maximum intensity of one or more of the time-separated pulses.

34. The system of example 31, wherein the time-encoded variation comprises at least one of frequency modulation and amplitude modulation.

35. The system of example 31, wherein the time-encoded variation comprises at least one of a Manchester code, a Hamming code, a heterodyne signal, and a pseudo-random intensity variation.

These and many other features and advantages of the present invention will be appreciated when the following figures and description are further taken into account.

BRIEF DESCRIPTION OF THE DRAWINGS

FIG. 1.1 illustrates a conventional display system for simulating three-dimensional imagery for a user.

FIGS. 1.2 to 1.4 illustrate relationships between radius of curvature and focal radius.

FIG. 1.5 illustrates a representation of the accommodation-vergence response of the human visual system.

FIG. 1.6 illustrates examples of different accommodative states and vergence states of a pair of eyes of the user.

FIG. 1.7 illustrates an example of a representation of a top-down view of a user viewing content via a display system.

FIG. 1.8 illustrates another example of a representation of a top-down view of a user viewing content via a display system.

FIG. 1.9 illustrates aspects of an approach for simulating three-dimensional imagery by modifying wavefront divergence.

FIG. 1.10 illustrates an example of a waveguide stack for outputting image information to a user.

FIG. 1.11 illustrates an example of exit beams outputted by a waveguide.

FIG. 1.12 illustrates an example of a stacked waveguide assembly in which each depth plane includes images formed using multiple different component colors.

FIG. 1.13 illustrates a cross-sectional side view of an example of a set of stacked waveguides that each includes an incoupling optical element.

FIG. 1.14 illustrates a perspective view of an example of the plurality of stacked waveguides of FIG. 1.13.

FIG. 1.15 illustrates a top-down plan view of an example of the plurality of stacked waveguides of FIGS. 1.13 and 1.14.

FIGS. 2A-2D illustrate certain aspects of various augmented reality systems for wearable computing applications, featuring a head-mounted component operatively coupled to local and remote process and data components.

FIG. 5 illustrates a head-mounted spectroscopy system integrating AR/VR functionality according to some embodiments.

FIG. 11 illustrates a method for identifying materials or material properties through a head-mounted spectroscopy system with correction for ambient light according to some embodiments.

DETAILED DESCRIPTION

By virtue of the fact that at least some of the components in a wearable computing system, such as an AR or VR system, are close to the body of the user operating them, there is an opportunity to utilize some of these system components to conduct certain physiologic monitoring relative to the user and to perform such monitoring spontaneously, as desired. For example, physiologic monitoring may be conducted by measuring light absorption.

Figure 4B:
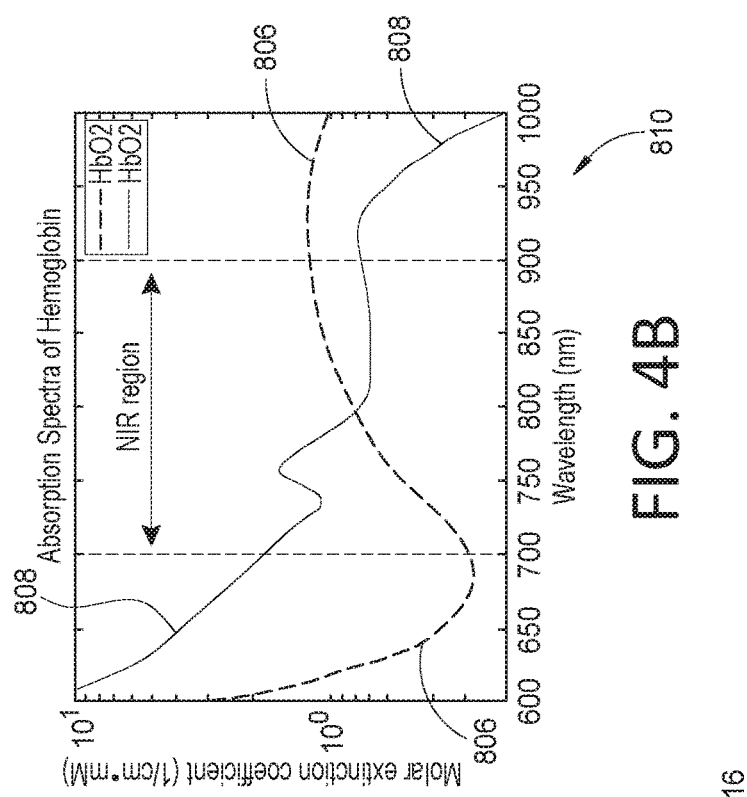
FIGS. 4A-4D illustrate various aspects of pulse oximetry configurations and calibration curves related to scattering of light in oxygenation of blood.
Figure 4A:
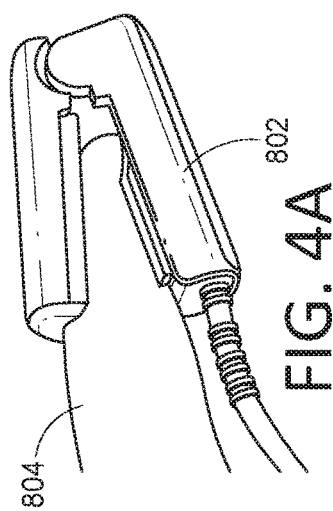

In conventional light absorption measurement techniques (for example pulse oximetry meters attachable to a person's finger as in FIG. 4A or in glucose detection), light is emitted in a controlled and fixed direction and received in a controlled and fixed receiver. Light is pulsed at different wavelengths through surrounding tissue structures while also being detected at another side of the tissue structure (and therefore measuring light properties such as absorption and scatter). In such systems, the measurement of light emitted compared to the measurement of light detected can provide an output that is proportional to, or reads as, an estimated tissue or tissue property (for example, an estimated blood oxygen saturation level for pulse oximetry meters), or simply a material or tissue type otherwise. Calibration curves depicting a ratio of light of interest relative to other light are also possible to predict properties of underlying tissue as a function of the light incident to it as shown in FIG. 4D.

Raman spectroscopy is another technique that measures inelastic scattering of photons released by irradiated molecules. Specific molecules will present specific shifts of wavelengths when irradiated, thereby presenting unique scattering effects that may be used to measure and quantify molecules within a sample.

FIG. 4B illustrates a chart of the absorption spectra of hemoglobin that is oxygenated (806) versus deoxygenated (808), and as shown in such plots (806, 808), in the red light wavelength range of the electromagnetic spectrum, such as around 660 nm, there is a notable difference in absorption for oxygenated versus deoxygenated hemoglobin, whereas there is an inverted difference at around 940 nm in the infrared wavelength range. The plots of the absorption spectra of oxygenated (806) and deoxygenated (808) hemoglobin cross within the near infrared region, which spans, e.g., between approximately 700 nm and 900 nm. Pulsing radiation at such wavelengths and detecting with a pulse oximeter is known to take advantage of such absorption differences in the determination of oxygen saturation for a particular user.

Figure 4C:
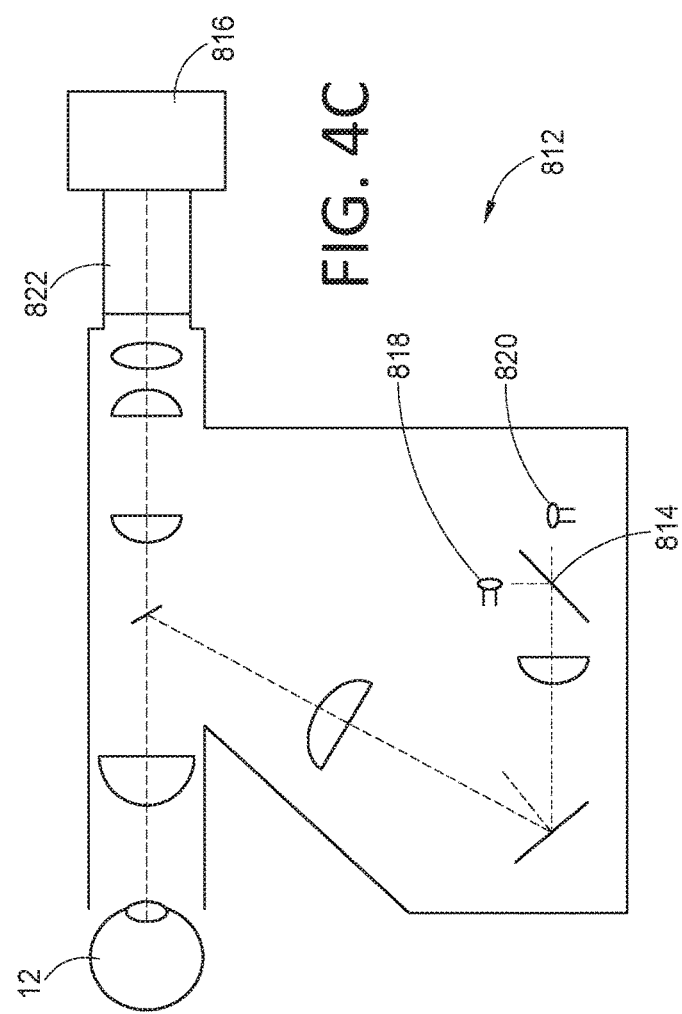
Figure 4D:
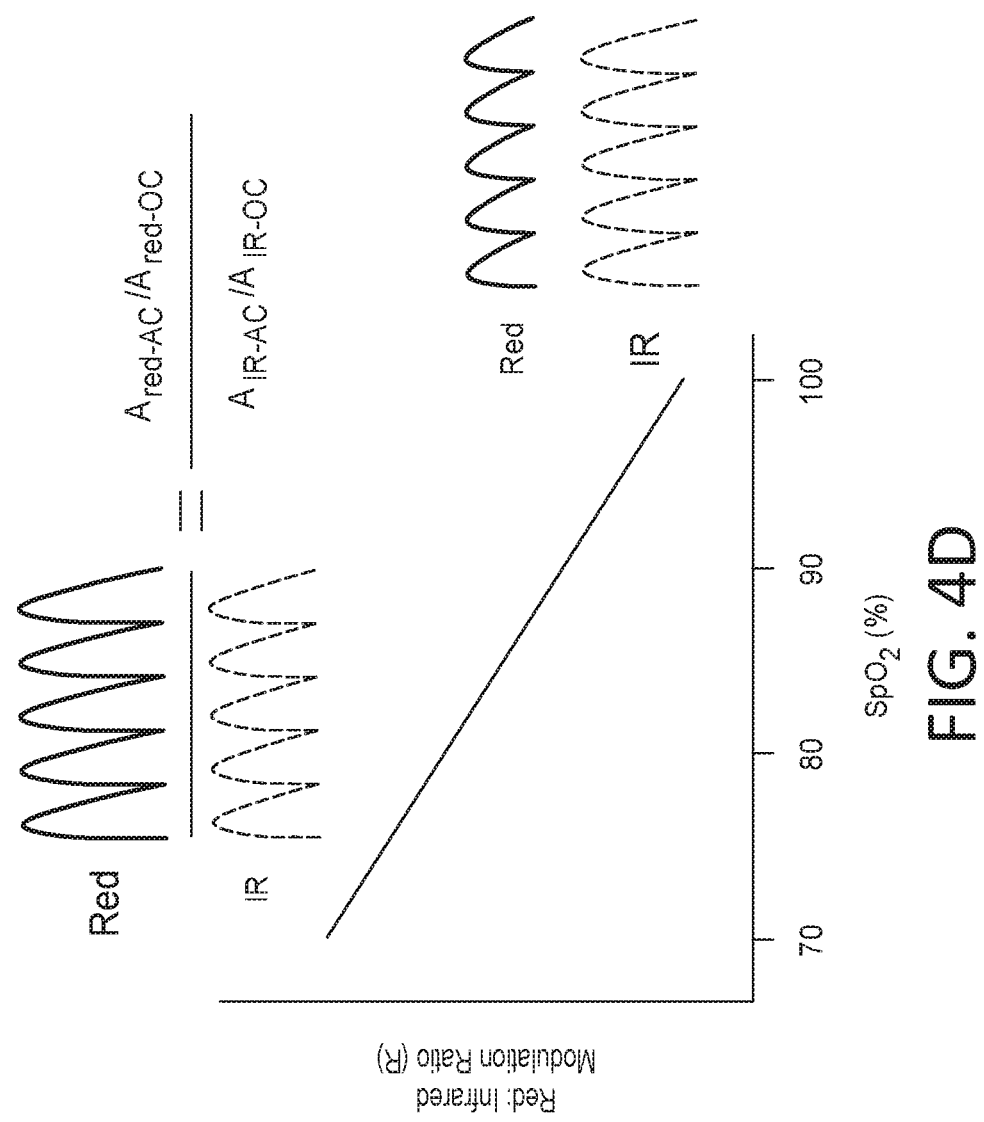

While pulse oximeters (802) typically are configured to at least partially encapsulate a tissue structure such as a finger (804) or ear lobe, certain desktop style systems have been suggested, such as that (812) depicted in FIG. 4C, to observe absorption differences in vessels of the eye, such as retinal vessels, but may be configured to detect properties of other tissues as well.

Such a configuration (812) may be termed a flow oximeter or spectroscope system and may comprise components as shown, including a camera (816), zoom lens (822), first (818) and second (819) light emitting diodes (LEDs), and one or more beam splitters (814). While it would be valuable to certain users, such as high-altitude hikers, athletes, or persons with certain cardiovascular or respiratory problems, to be able to retrieve information of their blood oxygen saturation as they move about their day and conduct their activities, or for caregivers to analyze tissue in real time for underlying abnormalities, most configurations involve a somewhat inconvenient encapsulation of a tissue structure, or are not portable or wearable, do not consider other absorption properties indicative of other tissue states or materials, or do not correlate gaze a user is looking at as part of directionality of its sensors (in other words, selectivity of target objects of for identification and analysis by spectroscopy is lacking).

Advantageously, in some embodiments, a solution is presented herein which combines the convenience of wearable computing in the form of an AR or VR display system with an imaging means to determine additional tissue identification and properties in real time within a field of view of a user. In addition, the accuracy of tissue identification may be increased by accounting for ambient light, as disclosed herein.

In some embodiments, a mixed reality system is configured to perform spectroscopy. Mixed reality (alternatively abbreviated as "MR") typically involves virtual objects integrated into and responsive to the natural world. For example, in an MR scenario, AR content may be occluded by real world objects and/or be perceived as interacting with other objects (virtual or real) in the real world. Throughout this disclosure, reference to AR, VR or MR is not limiting on the invention and the techniques may be applied to any context.

Some embodiments are directed to a wearable system for identifying substances (such as tissue, cells within tissue, or properties within cells/tissue) as a function of light wavelength emitted from a light emitter and subsequently received by, reflected to, and detected at one or more electromagnetic radiation detectors forming part of head-mounted member removably coupleable, or mountable, to a user's head. Though this disclosure mainly references tissue, or tissue properties, as a subject for analysis according to various embodiments, the technologies and techniques and components are not limited to such. Some embodiments utilize one or more light sources, such as electromagnetic radiation emitters coupled to the head-mounted frame, to emit light in one or more wavelengths in a user-selected direction. Such embodiments permit continuous, and even passive, measurements. For example, a user wearing a head mounted system could conduct a given activity, but inward facing sensors could detect properties of the eye without interfering with the activity.

It will be appreciated that the presence of ambient light in the environment may complicate these spectroscopic systems and methods. In the presence of ambient light (e.g., light present in the ambient environment but not outputted by the wearable system for purposes of substance identification), the light received by the electromagnetic radiation detectors may include a combination of the reflected emitted light and ambient light. Because the various properties (including the amount) of the ambient light may not be known or predicted, the contribution of the ambient light to the light detected by the system may yield accurate spectroscopic data. In some embodiments, the wearable system is configured to account for the effects of ambient light on the spectroscopic methods described herein. The wearable system may be configured to emit light from a light source of the system, detect a portion of the emitted light reflected from a surface of a target object, apply an ambient light correction, and identify one or more material properties of the object based on properties of the reflected light, such as absorption at a wavelength or range of wavelengths.

Accordingly, the controller, light source(s), and/or electromagnetic radiation detector(s) may further be configured to reduce and/or remove the confounding effect of ambient light contributions to the detected light. In some embodiments, the system may be configured to detect a baseline or ambient light correction that can be subtracted from spectroscopic measurements. The baseline or ambient light correction may include, for example, one or more of an ambient light intensity value, an average, median or other statistical quantity derived from a plurality of ambient light intensity values, a time-domain ambient light intensity function determined based on one or more measured ambient light intensity values, etc. For example, a baseline or ambient light correction may be obtained by detecting light at a radiation detector (which may be used for spectroscopic analysis) while light is not being emitted for spectroscopic measurement. In another example, the system may include an ambient light sensor separate from the photodetector or other radiation detectors used for spectroscopic analysis. In another example, the system may utilize time-domain multiplexing in the emitted light signal to remove the ambient light contribution, with or without using a separate ambient light sensor.

In some embodiments, an anti-scatter grid may be provided an optical path between an object being analyzed in the radiation detectors used to measure reflected light to determine absorbance. The anti-scatter grid prevents scattered light from being captured by the radiation detectors. In some embodiments, the scattered light may be understood to be ambient light and, as such, is desirably excluded from the reflected light measurement.

Advantageously, the wearable system may be configured to identify and/or measure properties of objects on or part of the user, or separate from the user. For example, a user could wear a system configured to look inward to the user's eyes and identify or measure tissue properties of the eye, such as blood concentration in a blood vessel of the eye. In other examples of inward systems, fluids such as intraocular fluid may be analyzed and not simply tissue properties. In other examples, a system could comprise sensors that look outward towards the external world and identify or measure tissue or material properties other than the eye, such as an extremity of the user or object in the ambient environment apart from the user.

In outward looking systems, eye tracking cameras coupled to the head-mounted member can determine the directional gaze a user is looking, and a processor or controller may correlate that gaze with observation of a real world target object through images captured from a real-world capturing system (such as cameras or depth sensors) coupled to the head-mounted member. Light sources coupled to the head-mounted system emit light away from the user, such as infrared light for example from an electromagnetic radiation emitter, and in some embodiments emit light to create an irradiation pattern in a substantially same direction as a gaze direction determined by the eye tracking cameras, thereby emitting upon the target object.

In some embodiments, real world capturing systems capture an object. For example a depth sensor, such as a vertical cavity surface emitting laser, may determine the outline of an object through collecting time of flight signals impacting the object. The object, once identified at its contours by such real-world capturing system may be highlighted and available for labeling. In some embodiments, a camera system of a given field of view defines an area available for highlighting and labelling. For example, a camera correlating to a user's gaze may encompass a 5 degree field of view, 10 degree field of view, or suitable increments preferably up to a 30 degree central vision field of view that the light source will emit light substantially within.

In some embodiments, such a system further comprises one or more electromagnetic radiation detectors or photo-detectors coupled to the head-mounted member configured to receive reflected light that was emitted from the light source and reflected from the target object; and a controller operatively coupled to the one or more electromagnetic radiation emitters and one or more electromagnetic radiation detectors configured to cause the one or more electromagnetic radiation emitters to emit pulses of light while also causing the one or more electromagnetic radiation detectors to detect levels of light absorption related to the emitted pulses of light as a function of any received reflected light of a particular pulse emission.

In some embodiments, the system further comprises a processor to match a wavelength of reflected light received by a detector from the target object to a characteristic such as a particular material, tissue type, or property (e.g., a change in one or more chemical properties or compositions of a tissue) of an underlying tissue. In some embodiments, other light characteristics are determined, such as polarization changes relative to emitted light and detected light or scattering effects, though for purposes of this description wavelength characteristics are used as an exemplary light characteristic. For example, in some embodiments, an inward electromagnetic radiation emitter emits light in the infrared spectrum to the retina of a user, receives reflected light, and matches the wavelength of the reflected light to determine a physical property such as the type of tissue or oxygen saturation in the tissue. In some embodiments, the system comprises outward facing light sources, and emits infrared light to a target object (such as an extremity of a user or third person), receives reflected light, and matches the reflected light wavelength to determine the observed material. For example, such an outward facing system may detect the presence of cancerous cells among healthy cells. Because cancerous, or other abnormal cells, reflect and absorb light differently than healthy cells, a reflection of light at certain wavelengths can indicate the presence and amount of abnormality.

In some embodiments, the controller receives the captured target object from the real world capturing system, and applies a label to the target object indicative of the identified property. In some embodiments, the label is a textual label or prompt within a display of the head mounted-member. In some embodiments, the label is an audio prompt to a user. In some embodiments, the label is a virtual image of similar tissue, such as referenced in a medical book, superimposed near the target object for ready comparative analysis by the user.

In some embodiments, the head-mounted member may comprise an eyeglasses frame. The eyeglasses frame may be a binocular eyeglasses frame. The one or more radiation emitters may comprise a light source, such as a light emitting diode. The one or more radiation emitters may comprise a plurality of light sources configured to emit electromagnetic radiation at two or more different wavelengths. The plurality of light sources may be configured to emit electromagnetic radiation at a first wavelength of about 660 nanometers, and a second wavelength of about 940 nanometers. The one or more radiation emitters may be configured to emit electromagnetic radiation at the two different wavelengths sequentially. The one or more radiation emitters may be configured to emit electromagnetic radiation at the two predetermined wavelengths simultaneously. The one or more electromagnetic radiation detectors may comprise a device selected from the group consisting of: a photodiode, a photodetector, and a digital camera sensor. The one or more electromagnetic radiation detectors may be positioned and oriented to receive light reflected after encountering a target object. The one or more electromagnetic radiation detectors may be positioned and oriented to receive light reflected after encountering observed tissue or material; that is, the one or more electromagnetic radiation detectors are oriented substantially in the same direction as the one or more electromagnetic radiation emitters, whether inward facing towards a user's eye or outward facing towards a user's environment.

The controller may be further configured to cause the plurality of light sources to emit a cyclic pattern of first wavelength on, then second wavelength on, then both wavelengths off, such that the one or more electromagnetic radiation detectors detect the first and second wavelengths separately. The controller may be configured to cause the plurality of light emitting diodes to emit a cyclic pattern of first wavelength on, then second wavelength on, then both wavelengths off, in a cyclic pulsing pattern about thirty times per second.

In some embodiments, the controller may be configured to calculate a ratio of first wavelength light measurement to second wavelength light measurement. In some embodiments this ratio may be further converted to an oxygen saturation reading via a lookup table based at least in part upon the Beer-Lambert law. In some embodiments, the ratio is converted to a material identifier in external lookup tables, such as stored in an absorption database module on a head-mounted member or coupled to a head-mounted member on a local or remote processing module. For example, an absorption database module for absorption ratios or wavelength reflection of particular tissues may be stored in a "cloud" storage system accessible by health care providers and accessed through a remote processing module. In some embodiments, an absorption database module may store absorption properties (such as wavelength ratios or wavelength reflections) for certain foods and be permanently stored on a local processing module to the head-mounted member.

In this way, the controller may be configured to operate the one or more electromagnetic radiation emitters and one or more electromagnetic radiation detectors to function as a broad use head-mounted spectroscope. The controller may be operatively coupled to an optical element coupled to the head-mounted member and viewable by the user, such that the output of the controller indicating the wavelength properties indicative of a particular tissue property or material otherwise may be viewed by the user through the optical element. The one or more electromagnetic radiation detectors may comprise a digital image sensor comprising a plurality of pixels, wherein the controller is configured to automatically detect a subset of pixels which are receiving the light reflected after encountering, for example, tissue or cells within the tissue. In some embodiments, such subset of pixels are used to produce an output representative of the target object within the field of view of the digital image sensor. For example, the output may be a display label that is indicative of an absorption level of the tissue. In some embodiments, comparative values are displayed as an output. For example, an output may be a percentage saturation of oxygen of blood from a first analysis time and a percentage saturation of oxygen at a second analysis time with a rate of change noted between the two times. In these embodiments, ailments such as diabetic retinopathy may be detected by recognizing changes in measured properties over time.

In some embodiments, the controller may be configured to automatically detect the subset of pixels based at least in part upon reflected light luminance differences amongst signals associated with the pixels. The controller may be configured to automatically detect the subset of pixels based at least in part upon reflected light absorption differences amongst signals associated with the pixels. In such embodiments, such subsets may be isolated pixels and flagged for further analysis, such as additional irradiation or mapping, or a virtual image may be overlaid on such pixels to provide visual contrast to the isolated pixels displaying other properties to serve as a notice to a user of the different properties of the subpixels identified by the system.

In some embodiments, the system data collection is time multiplexed not only for pulsing and recording light pulses, but passively collected at multiple times a day. In some embodiments, a GPS or other similar mapping system is coupled to the system to correlate a user's location or time of day with certain physiological data collected. For example, a user may track physiological responses relative to certain locations or activities throughout a day.

Reference will now be made to the drawings, in which like reference numerals refer to like parts throughout. Unless specifically indicated otherwise, the drawings are schematic not necessarily drawn to scale.

Figure 1:
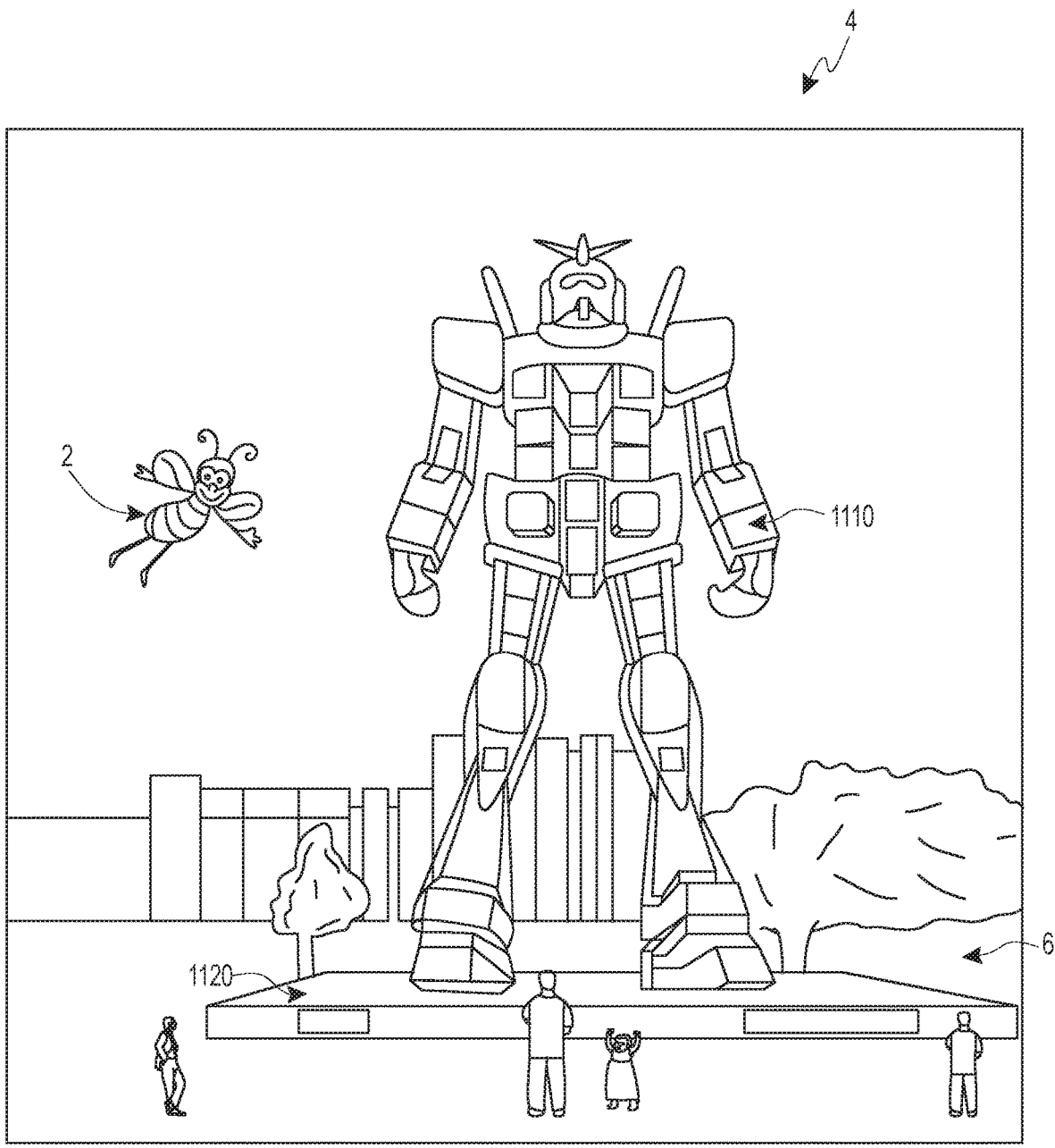
FIG. 1 illustrates certain aspects of an augmented reality system presentation to a user.

FIG. 1.1 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 1.1, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Generating a realistic and comfortable perception of depth is challenging, however. It will be appreciated that light from objects at different distances from the eyes have wavefronts with different amounts of divergence. FIGS. 1.2 to 1.4 illustrate relationships between distance and the divergence of light rays. The distance between the object and the eye 210 is represented by, in order of decreasing distance, R1, R2, and R3. As shown in FIGS. 1.2 to 1.4, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 1.2 to 1.4 and other figures herein, the discussions regarding eye 210 may be applied to both eyes 210 and 220 of a viewer.

With continued reference to FIGS. 1.2 to 1.4, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

With reference now to FIG. 1.5, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 1.5, accommodation may be understood to be the process by which the eye achieves a particular accommodative state, and vergence may be understood to be the process by which the eye achieves a particular vergence state. As indicated in FIG. 1.5, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

With reference now to FIG. 1.6, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 1.6, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the pupils of the user's eyes. Thus, a depth plane 240 located at a depth of 1 m corresponds to a distance of 1 m away from the pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the pupils of the user's eyes. That value may be called the eye relief and corresponds to the distance between the pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

With reference now to FIGS. 1.7 and 1.8, examples of matched accommodation-vergence distances and mismatched accommodation-vergence distances are illustrated, respectively. As illustrated in FIG. 1.7, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 1.8, images displayed to the eyes 210, 220 may be displayed with wavefront divergence corresponding to depth plane 240, and the eyes 210, 220 may assume a particular accommodative state in which the points 15*a*, 15*b* on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the pupils of the eyes 210, 220 to the depth plane 240, while the vergence distance corresponds to the larger distance from the pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, from the center of rotation of an eye, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 1.10) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

FIG. 1.9 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated that a depth plane may follow the contours of a flat or a curved surface. In some embodiments, advantageously for simplicity, the depth planes may follow the contours of flat surfaces.

FIG. 1.10 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 1.10, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the relatively large area surfaces of the waveguide between which the thickness of the waveguide extends. In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 70 or 72 (FIG. 2A) in some embodiments.

With continued reference to FIG. 1.10, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 1.10, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 1.10, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 54 (FIG. 2A) and may be in electrical communication with the processing modules 140 and/or 150, which may process image information from the camera assembly 630. In some embodiments, one camera assembly 630 may be utilized for each eye, to separately monitor each eye.

With reference now to FIG. 1.11, an example of exit beams outputted by a waveguide is shown. One waveguide is illustrated, but it will be appreciated that other waveguides in the waveguide assembly 260 (FIG. 1.10) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

In some embodiments, a full color image may be formed at each depth plane by overlaying images in each of the component colors, e.g., three or more component colors. FIG. 1.12 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 1.12, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 1.10) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

With reference now to FIG. 1.13, in some embodiments, light impinging on a waveguide may need to be redirected to in-couple that light into the waveguide. An in-coupling optical element may be used to redirect and in-couple the light into its corresponding waveguide. FIG. 1.13 illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 1.10) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 1.10, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 1.13, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 1.10).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 1.13, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

With reference now to FIG. 1.14, a perspective view of an example of the plurality of stacked waveguides of FIG. 1.13 is illustrated. As noted above, the incoupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 1.13, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 1.11). It will be appreciated that the OPE's may be configured to increase the dimensions of the eye box in at least one axis and the EPE's may be configured to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 1.10. In some embodiments, the OPE and/or EPE may be configured to modify a size of the beams of light.

Accordingly, with reference to FIGS. 1.13 and 1.14, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

FIG. 1.15 illustrates a top-down plan view of an example of the plurality of stacked waveguides of FIGS. 1.13 and 1.14. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR that access and create external information sources.

Figure 2A:
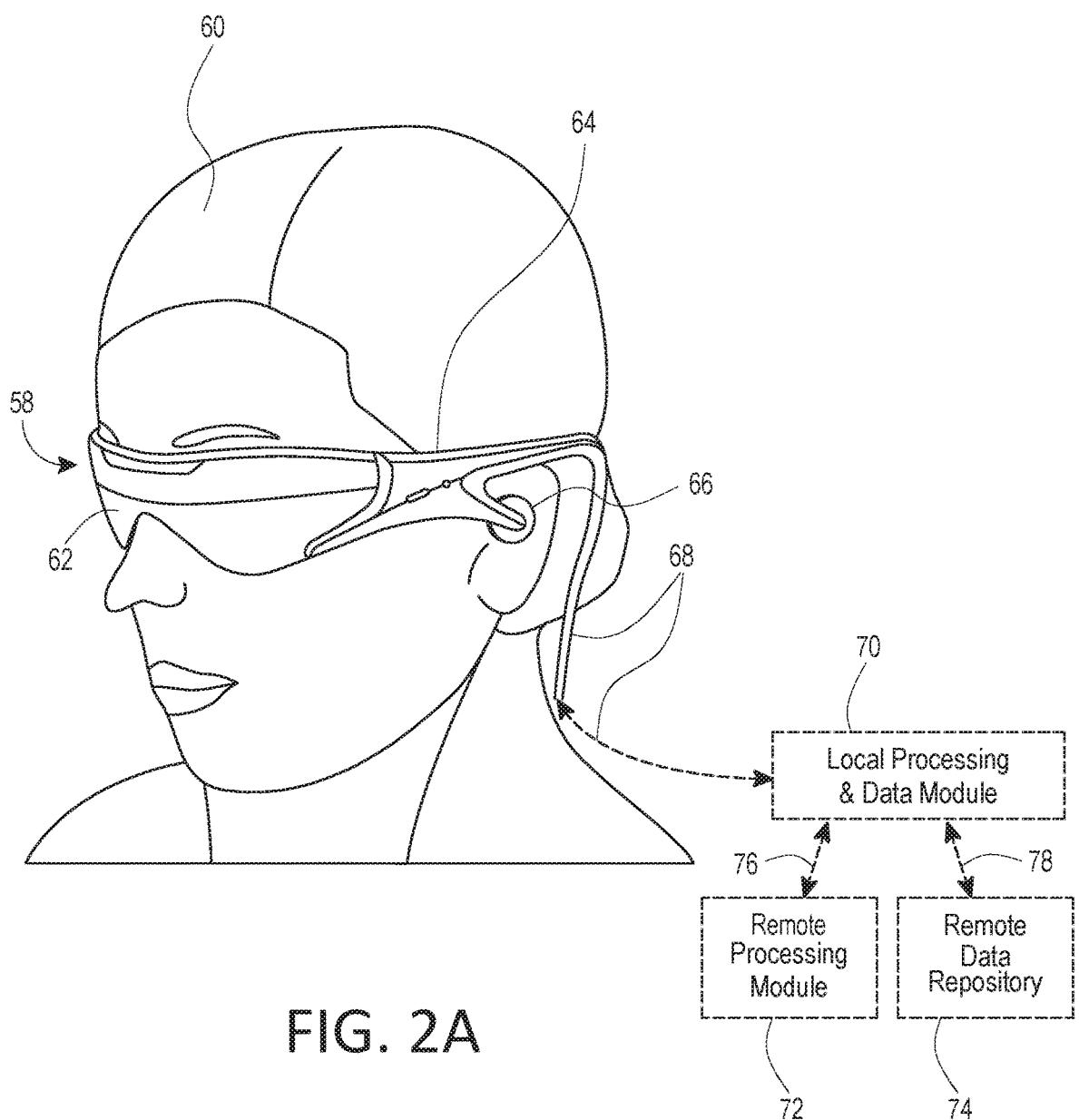
Figure 2B:
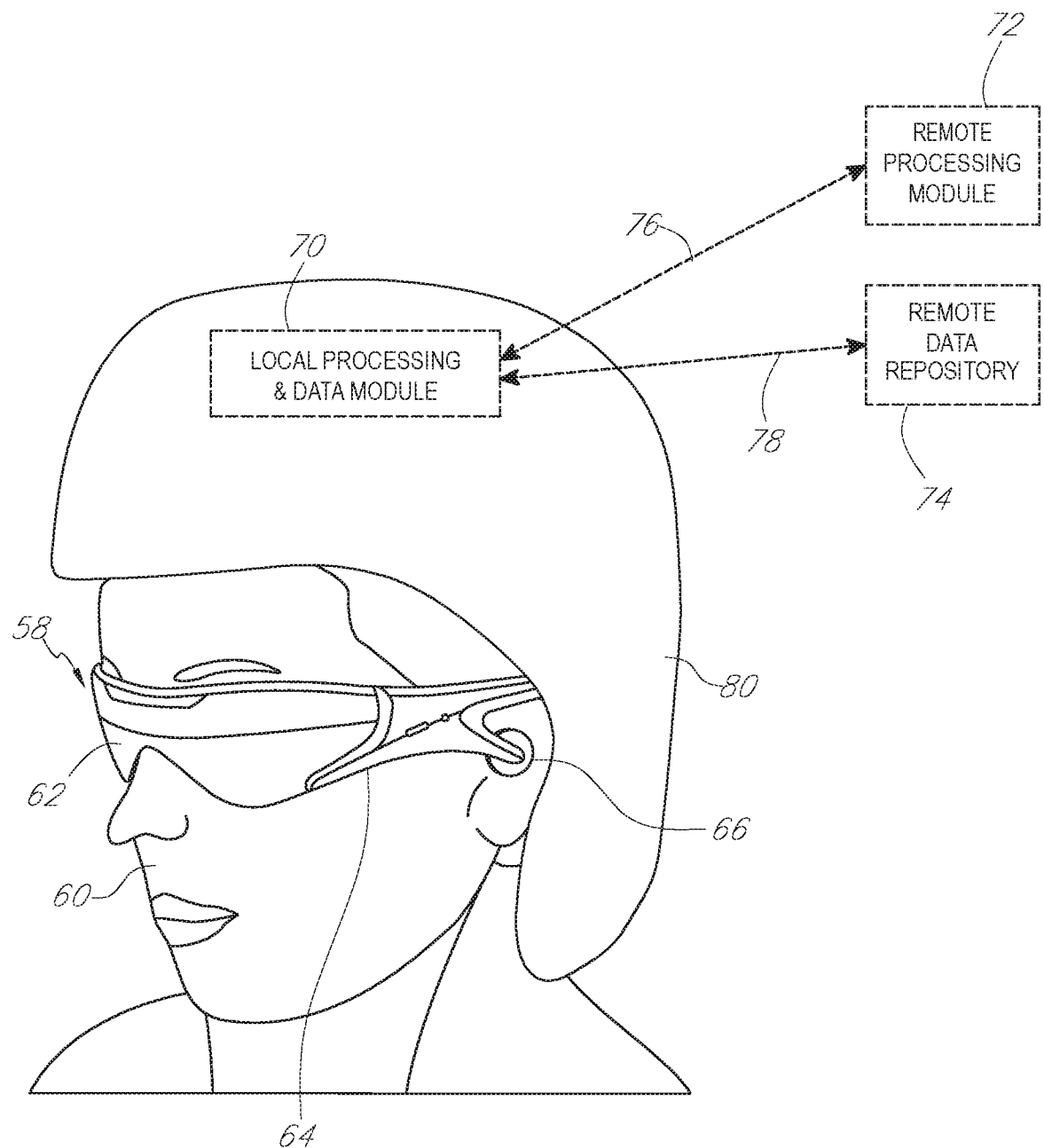
Figure 2C:
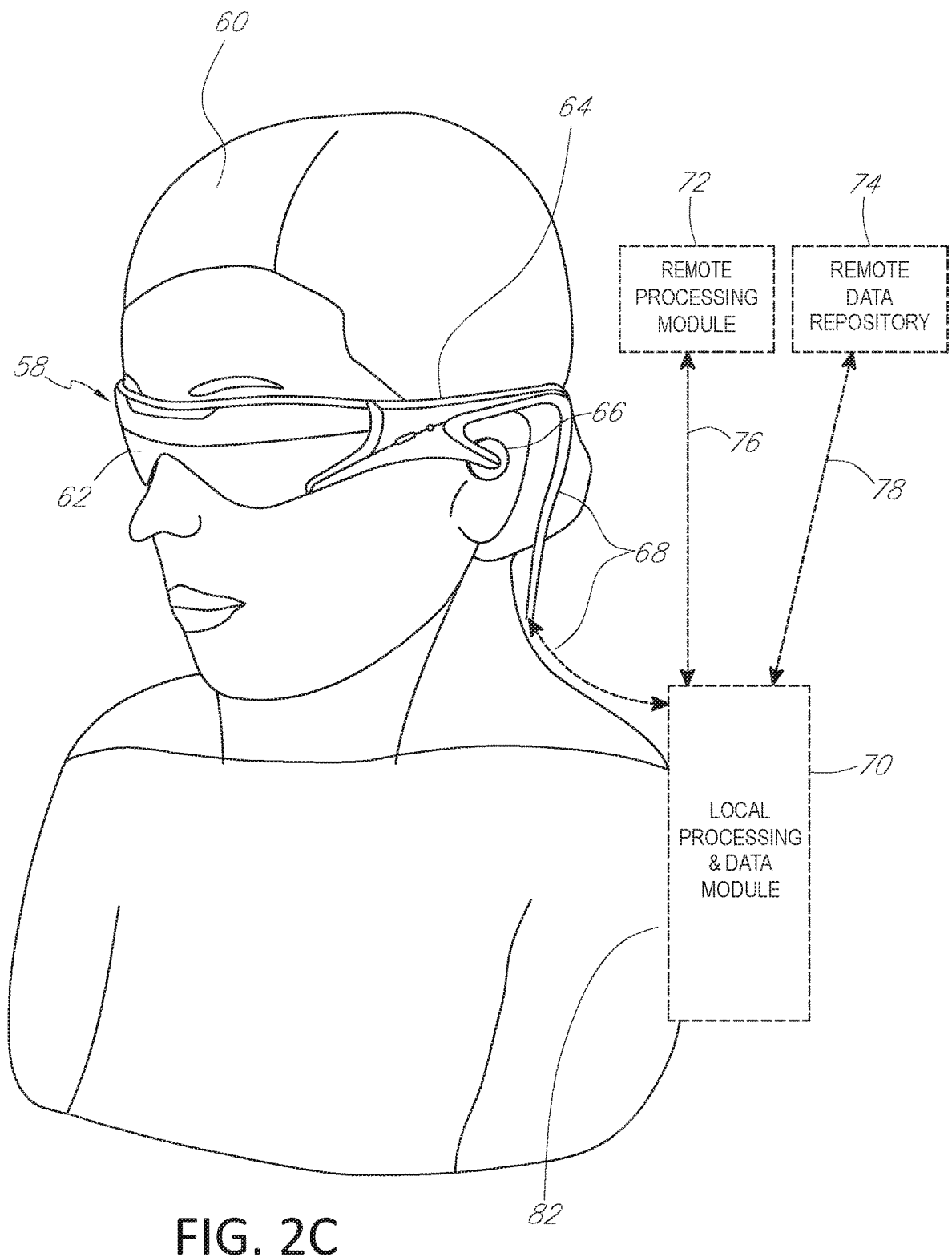

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a processor or controller (e.g., a power-efficient processor or controller), as well as digital memory, such as flash memory, both of which may be utilized to assist in the processing, caching, and storage of data a) captured from sensors which may be operatively coupled to the frame (64), such as electromagnetic emitters and detectors, image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data, light properties emitted or received, and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
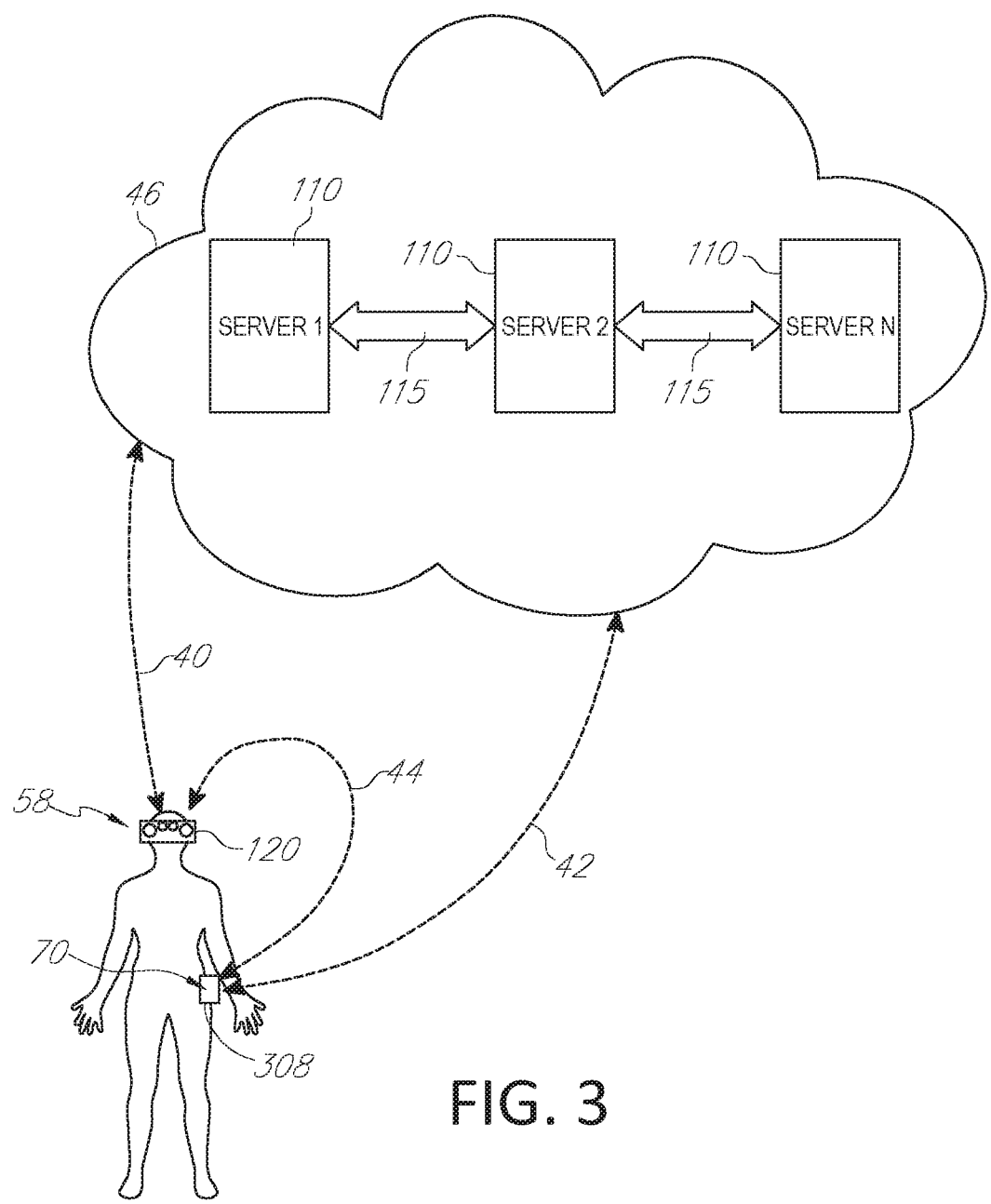
FIG. 3 illustrates certain aspects of a connectivity paradigm between a wearable augmented or virtual reality system and certain remote processing and/or data storage resources.

Referring now to FIG. 3, a schematic illustrates coordination between the cloud computing assets (46) and local processing assets, which may, for example reside in head mounted components (58) coupled to the user's head (120) and a local processing and data module (70), coupled to the user's belt (308); therefore the component 70 may also be termed a "belt pack" 70), as shown in FIG. 3. In one embodiment, the cloud (46) assets, such as one or more server systems (110) are operatively coupled (115), such as via wired or wireless networking (wireless generally being preferred for mobility, wired generally being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8.

In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may, e.g., partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. In some embodiments, the augmented experience of the person standing near the statue (i.e., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, where the trees are, where the statue is—but with that information on the cloud, the joining friend can download from the cloud aspects of the scenario, and then start walking along as an augmented reality local relative to the person who is actually in the park.

3-D points may be captured from the environment, and the pose (i.e., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So, at the base level, in some embodiments a person-worn system may be utilized to capture both 3-D points and the 2-D images that produced the points, and these points and images may be sent out to a cloud storage and processing resource. They may also be cached locally with embedded pose information (e.g., cache the tagged images); so, the cloud may have on the ready (e.g., in available cache) tagged 2-D images (e.g., tagged with a 3-D pose), along with 3-D points. If a user is observing something dynamic (e.g., a scene with moving objects or features), he/she may also send additional information up to the cloud pertinent to the motion (for example, if looking at another person's face, the user can take a texture map of the face and push that up at an optimized frequency even though the surrounding world is otherwise basically static). As noted above, more information on object recognizers and the passable world model may be found in U.S. patent application Ser. No. 14/205,126, entitled "System and method for augmented and virtual reality", which is incorporated by reference in its entirety herein, along with the following additional disclosures, which relate to augmented and virtual reality systems such as those developed by Magic Leap, Inc. of Fort Lauderdale, Fla.: U.S. patent application Ser. No. 14/641,376; U.S. patent application Ser. No. 14/555,585; U.S. patent application Ser. No. 14/212,961; U.S. patent application Ser. No. 14/690,401; U.S. patent application Ser. No. 13/663,466; U.S. patent application Ser. No. 13/684,489; and U.S. Patent Application Ser. No. 62/298,993, each of which is incorporated by reference herein in its entirety.

In some embodiments, the use of such passable world information may permit identification and labelling of objects by spectroscopy to then pass between users. For example, in a clinical setting, a first caregiver operating a device implementing features of the present disclosure may map and detect cancerous tissue on a patient and assign and apply a virtual label, much like a metatag, to the tissue. A second caregiver similarly wearing such a device may then look at the same cancerous tissue cell cluster and receive notice of the virtual label identifying such cells without needing to engage in one or more of emitting light, receiving light, matching an absorption trait to a tissue, and labeling the tissue independently.

GPS and other localization information may be utilized as inputs to such processing. It will be appreciated that highly accurate localization of the user's head, totems, hand gestures, haptic devices etc. can facilitate displaying appropriate virtual content to the user, or passable virtual or augmented content among users in a passable world.

Referring to FIG. 5, a top orthogonal view of a head mountable component (58) of a wearable computing configuration is illustrated featuring various integrated components for an exemplary spectroscopy system. The configuration features two display elements (62—binocular—one for each eye), two forward-oriented cameras (124) for observing and detecting the world around the user, each camera (124) having an associated field of view (18, 22), and at least one spectroscopy array (126, described in greater detail in FIG. 6), with a field of view (20); also a forward-oriented relatively high resolution picture camera (156) with a field of view (26), one or more inertial measurement units (102), and a depth sensor (154) with an associated field of view (24), such as described in the aforementioned incorporated by reference disclosures. Facing toward the eyes (12, 13) of the user and coupled to the head mounted component (58) frame are eye tracking cameras (828, 830) and inward emitters and receivers (832, 834). One of skill in the art will appreciate the inward emitters and receivers (832, 834) emit and receive light directed towards the eyes in irradiation pattern (824, 826) much in the same way spectroscopy array (126) does for outward objects in its field of view (20). These components, or combinations less inclusive of all components are operatively coupled such as by wire lead, to a controller (844), which is operatively coupled (848) to a power supply (846), such as a battery.

In some embodiments, the head mountable component (58) may further include an ambient light detector (128) and/or an anti-scatter grid (129). The ambient light detector (128) includes at least one photodetector and may be oriented outward (e.g., generally forward-oriented) so as to capture ambient light from the world, or the ambient environment around the user. In some embodiments, the ambient light detector (128) may be forward-oriented, similar to the forward oriented cameras (124), such that ambient light may be detected while the spectroscopy array (126) is not emitting light for spectroscopic analysis. In another example, the ambient light detector (128) may be oriented outward in a non-forward direction (e.g., left, right, up, or down) such that ambient light may be detected independent of whether the spectroscopy array (126) is emitting light. The anti-scatter grid (129) may be located such that reflected light travels therethrough before being detected at the spectroscopy array (126). Ambient light detector (128) and anti-scatter grid (129) will be discussed in greater detail with reference to FIG. 6.

In some embodiments, the display elements (62) include one or more waveguides (e.g., a waveguide stack) which are optically transmissive and allow the user to "see" the world by receiving light from the world. The waveguides also receive light containing display information and propagate and eject the light to the user's eyes (12, 13), to thereby display an image to the user. Preferably, light propagating out of the waveguide provides particular, defined levels of wavefront divergence corresponding to different depth planes (e.g., the light forming an image of an object at a particular distance from the user has a wavefront divergence that corresponds to or substantially matches the wavefront divergence of light that would reach the user from that object if real). For example, the waveguides may have optical power and may be configured to output light with selectively variable levels of wavefront divergence. It will be appreciated that this wavefront divergence provides cues to accommodation for the eyes (12, 13). In addition, the display elements (62) utilize binocular disparity to further provide depth cues, e.g. cues to vergence of the eyes (12, 13). Advantageously, the cues to accommodation and cues to vergence may match, e.g., such that they both correspond to an object at the same distance from the user. This accommodation-vergence matching facilitates the long-term wearability of a system utilizing the head-mounted member (58).

With continued reference to FIG. 5, preferably, each emitter (126, 832, 834) is configured to controllably emit electromagnetic radiation in two or more wavelengths, such as about 660 nm, and about 940 nm, such as by LEDs, and preferably the fields of irradiation (824, 826) are oriented to irradiate targeted objects or surfaces. In some embodiments, targeted objects are inward, such as eyes (12, 13) and irradiation patterns (824, 826) may be fixed or broadened/narrowed to target specific areas of an eye in response to an eye tracking camera data point. In some embodiments, targeted objects are outward (e.g., away from the user), and the irradiation pattern within the field of view (20) of spectroscope array (126) conforms to a gaze of the eyes (12, 13) determined from eye tracking cameras (828, 830).

In some embodiments, the gaze may be understood to be a vector extending from the user's eye, such as extending from the fovea through the lens of the eye, and the emitters (832, 834) may output infrared light on the user's eyes, and reflections from the eye (e.g., corneal reflections) may be monitored. A vector between a pupil center of an eye (e.g., the display system may determine a centroid of the pupil, for instance through infrared imaging) and the reflections from the eye may be used to determine the gaze of the eye. In some embodiments, when estimating the position of the eye, since the eye has a sclera and an eyeball, the geometry can be represented as two circles layered on top of each other. The eye pointing vector may be determined or calculated based on this information. Also the eye center of rotation may be estimated since the cross section of the eye is circular and the sclera swings through a particular angle. This may result in a vector distance because of autocorrelation of the received signal against known transmitted signal, not just ray traces. The output may be seen as a Purkinje image 1400 which may in turn be used to track movement of the eyes.

One of skill in the art will appreciate other ways to determine an irradiation pattern within field of view (20) such as by head pose information determined by one or more of IMU (102).

In some embodiments, the emitters may be configured to emit wavelengths simultaneously, or sequentially, with controlled pulsatile emission cycling. The one or more detectors (126, 828, 830) may comprise photodiodes, photodetectors, and/or digital camera sensors (e.g., CCD or CMOS image sensors), and preferably are positioned and oriented to receive radiation that has encountered the targeted tissue or material or object otherwise. The one or more electromagnetic radiation detectors (126, 828, 830) may comprise a digital image sensor comprising a plurality of pixels, wherein the controller (844) is configured to automatically detect a subset of pixels which are receiving the light reflected after encountering a target object, and to use such subset of pixels to produce an output.

Figure 7A:
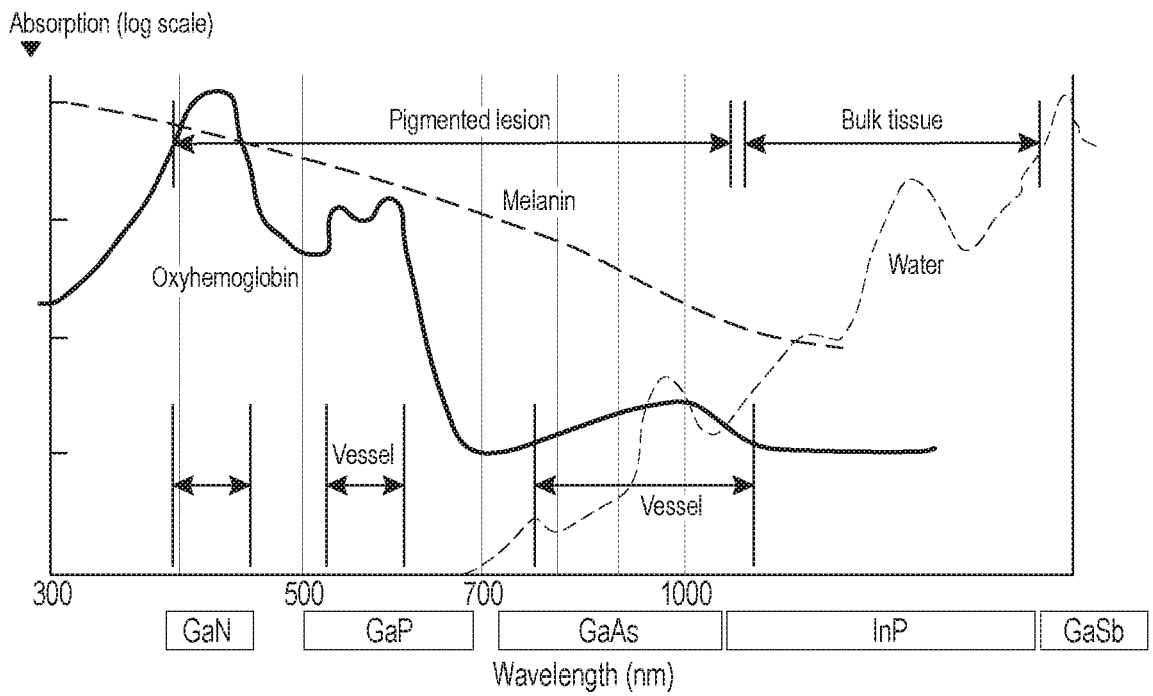
FIGS. 7A-7B are an example light saturation curve chart indicative of select properties by wavelengths.
Figure 7B:
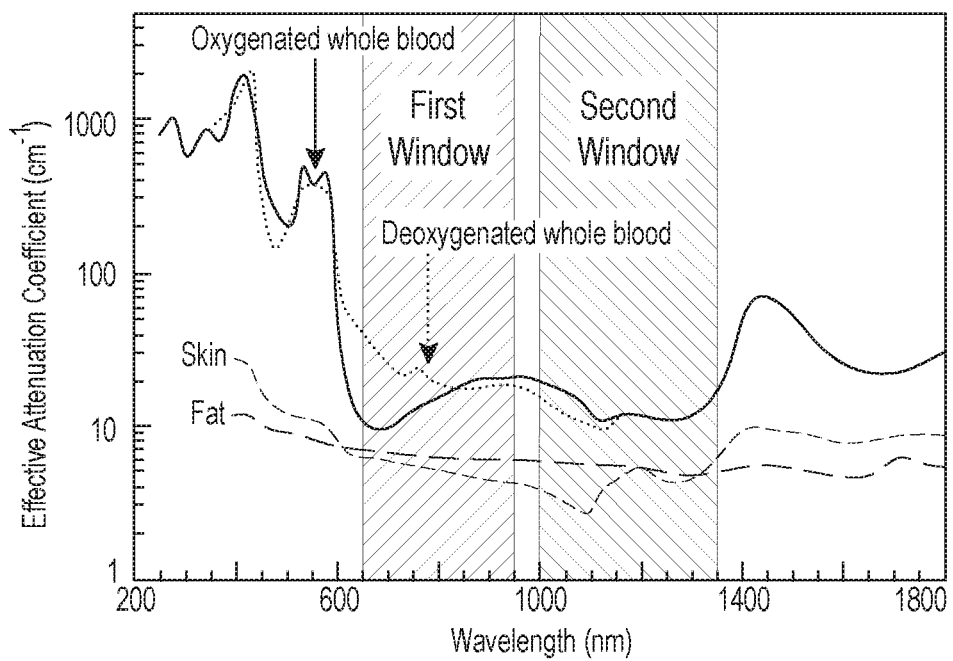

In some embodiments, the output is a function of matching received light against emitted light to a target from an absorption database of materials and material properties. For example, in some embodiments, an absorption database comprises a plurality of absorption charts such as depicted in FIGS. 7A and 7B. It will be appreciated that a database comprising charts may include electronic representations or transformations of the information in the charts, and the use of the term charts herein includes such representations or transformations. FIGS. 7A and 7B is merely used as an example, but demonstrates various tissue properties that may be detected from a given system emitting light from a particular light source and receiving light of a particular wavelength and/or light property to determine the probability of an observed target being a particular tissue or having particular properties within the tissue. Other charts, such as either saturation curves or calibration curves, may be selectively accessed by a user. For example, a user could choose absorption databases for a particular light source or wavelength patterns and then look around until the spectroscopy system identifies material matching the properties requested. Such an embodiment may be termed a "closed search," or one that looks for specific properties as opposed to an "open search" that looks at any target and then searches databases for matches on the light properties detected.

The controller (844) may be configured to automatically detect a subset of pixels within a field of view (124, or 126, or 824, 826, FIG. 5) based at least in part upon reflected light properties differences amongst signals associated with the pixels. For example, the controller (844) may be configured to automatically detect the subset of pixels based at least in part upon reflected light absorption differences amongst signals associated with the pixels. Without being limited by theory, light impacting upon an object will reflect, transmit (absorb), or scatter upon striking the object, such that R+T+S=1 (with R=reflection from the object, T=transmission/absorption into the object, and S=scatter from the object). If a particular subset of pixels reflects a higher proportion of light relative to surrounding subpixels, the controller may isolate these subpixels or note or register the pixel location for these different properties in a memory system. In some embodiments, the pixel location are stored in a passable world mapping system as dense or sparse mapping points such as additional users of a head mounted display system access the map, the subset of pixels are passed to the additional user and accessed and/or displayed on the second user's display.

Figure 6:
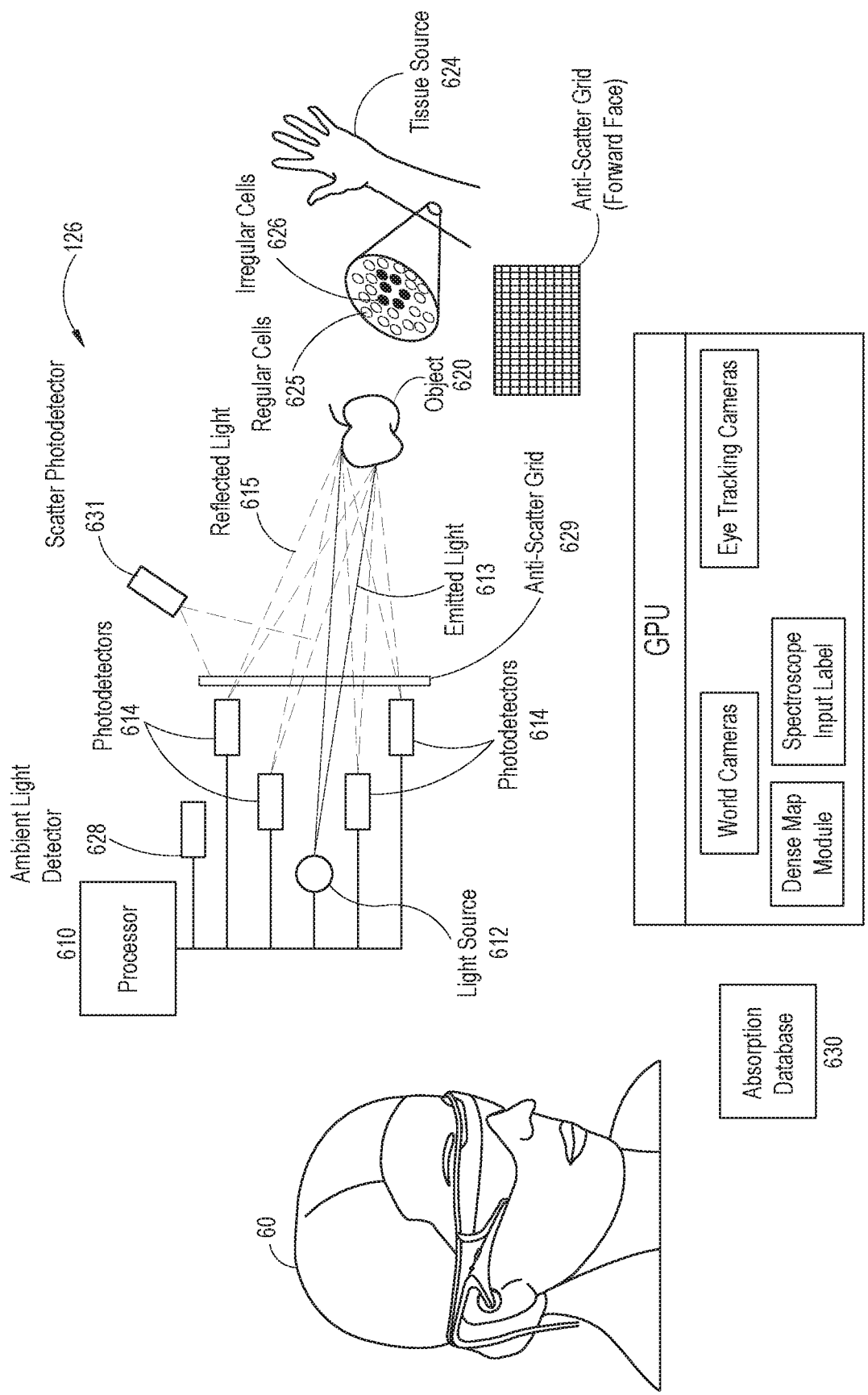
FIG. 6 illustrates various aspects of a wearable AR/VR system featuring integrated spectroscopy modules according to some embodiments.

Referring to FIG. 6, a spectroscopy array (126) may comprise a light source (612) emitting light (613) towards a target object (620). In some embodiments, the light source (612) is an electromagnetic emitter such as light emitting diodes. In some embodiments, the direction of emitted light (613) is substantially the same as a gaze orientation of a user (60) or a head pose orientation of a user (60). In some embodiments, photodetectors (614) capture reflected light (615) from the target object. In some embodiments, a processor (611), which may be controller (844) depicted in FIG. 5, determines an absorption property between emitted light (613) and reflected light (615) and matches the property from absorption database (630). In some embodiments, absorption database (630) is stored on a local processing module such as module (70) depicted in FIG. 2A for example; in some embodiments, absorption database (630) is stored on remote processing module (72) such as the one depicted in FIG. 2A.

In some embodiments, the spectroscopy array (126) further includes an ambient light detector (628), which may correspond to the ambient light detector (128) of FIG. 5. The ambient light detector (628) may be any type of electromagnetic radiation detector (e.g., a photodiode, a photodetector, digital camera sensor, CCD, CMOS) configured to detect light of the wavelengths produced by the light source (612) and/or a range of wavelengths similar to the wavelengths produced by the light source (612). The ambient light detector (628) may further be oriented similarly to the photodetectors (614) such that the direction and/or field of view imaged by the ambient light detector (628) is the same or similar to the direction and/or field of view imaged by the photodetectors (614). In some other embodiments, the ambient light detector (628) may be oriented to capture light from a different direction than the photodetectors (614). Such an arrangement may have advantages for guarding against unintentionally detecting reflected light (615).

The ambient light detector (628) may be configured to monitor ambient light continuously or at discrete intervals. In addition, ambient light detector (628) may be configured to monitor ambient light during times when the light source (612) is not emitting light for spectroscopic measurements, and/or during times when the light source (612) is emitting light but the system is not oriented toward a target object (620).

In some embodiments, the spectroscopy array (126) further includes an anti-scatter grid (629). In some embodiments, the anti-scatter grid (629) includes a grid of walls, defining openings therebetween. Light (615) travels through the grid in order to be received by the photodetectors (614). Preferably, the walls extend substantially parallel to the direction of propagation of the light (615), thereby defining openings through which that light may propagate to impinge on the photodetectors (614). In some embodiments, as seen in a view of the forward face of the anti-scatter grid (629), the openings may be in the shape of rectangles or squares. If someone environments, the openings may have any desired shape, e.g., circular, hexagonal, etc.

In some embodiments, the anti-scatter grid (629) make include a plurality of parallel components configured to attenuate light incident on the anti-scatter grid (629) that is not propagating generally perpendicular to the anti-scatter grid (629) (e.g., light that is within a range such as 1, 5°, 10°, etc., from perpendicular may be attenuated). The anti-scatter grid (629) is disposed along the path between the photodetectors (614) and the world, such that light being capture by the photodetectors preferably passes through the anti-scatter grid (629) before being captured or imaged. Thus, when performing spectroscopic methods according to some embodiments, light from the light source (612) that is directed back to the photodetectors (614) by retroreflection at the target object (620) may be generally perpendicular to the anti-scatter grid (629) and is not attenuated or minimally attenuated. However, scattered light and/or ambient light from other sources that may be present is likely to be propagating at larger angles relative to perpendicular. Thus, at least some ambient and scattered light is attenuated at the anti-scatter grid (629), thus reducing or eliminating its contribution to the light measured at the photodetectors (614).

In some embodiments, the spectroscopy array (126) may further include a scatter photodetector (631) configured to capture light reflected from the anti-scatter grid (629). For example, some embodiments of the anti-scatter grid (629) may include walls with a thickness sufficient to provide a surface, on the forward face of the anti-scatter grid (629), for scattered light to reflect off. The portion of the walls on the forward face of the anti-scatter grid (629) may be referred to as the forward face of the walls. In such embodiments, a fraction of the light incident on the anti-scatter grid (629) may pass through the opening defined between the walls of the anti-scatter grid (section 29) and the remainder of the light may be reflected by the forward face of those walls. Thus, the reflected light (615) incident on the forward face of the walls may be reflected away from the photodetectors (614), while scattered or ambient light incident on the forward face of the walls may reflect at an angle from the anti-scatter grid (629) and to be captured by the scatter photodetector (631), which is oriented to receive the scattered light. In some environments, it may be assumed that the fraction of light reflected by the forward face of the walls of the anti-scatter grid (629) is approximately equal to the fraction of the overall surface area of the anti-scatter grid (629) occupied by the forward face of the walls. Thus, the known fraction of the overall surface area occupied by the forward face of the walls may further be used (e.g., at the processor (611)) to adjust the amount of light measured at the scatter photodetector (631) to adjust for the reduction in intensity due to the presence of the anti-scatter grid (629). That is, part of the reflected light (615) may be blocked by the anti-scatter grid (629). Since the surface area of the forward face of the walls of the anti-scatter grid (629) may be known, and assuming that the amount of light blocked is proportional (e.g., roughly equal) to the surface area of that forward face of the walls, then the amount of light received by the photodetectors (614) may be scaled up to account for light that is blocked by the walls of the anti-scatter grid (629).

Object (620) is depicted as an apple in FIG. 6 for simplicity, and though food properties have their respective light absorption properties and embodiments of the invention may be used to identify food by its light properties, more sophisticated uses are also envisioned. In some embodiments, outward facing spectroscopy array (126) identifies tissue source (624), e.g., an arm as depicted for illustrative purposes. Emitted light (613) may impact upon tissue source (624) and reflected light (615) may indicate the presence of irregular cells (626) amongst regular cells (625). As light source (612) irradiates tissue source (624), irregular cells (626) will return a different light property to photodetectors (614) than regular cells (625). Irregular cells (626) may be cancerous, be part of scar tissue, or even healthy cells amongst the tissue simply indicating or having a difference with surrounding cells, for example indicating where blood vessels or bone within tissue source (624) may be located. In some embodiments, regular cells constitute the majority of cells in a sample under analysis and irregular cells constitute a minority of the cells of the sample, the irregular cells exhibiting a different detectable property than the regular cells. In some embodiments, real world cameras capturing images on a pixel level may mark such irregular cells (626). As previously described, one such marking may be a labeling system applying a textual image proximate to the irregular cells (626), another such labeling system may be a color overlay onto irregular cells (626), as seen through the display element 62 (FIG. 5).

Thus, with reference again to FIG. 5, a system is presented for determining tissue properties or materials otherwise through a wearable computing system, such as one for AR or VR, comprising: a head-mounted member (58) removably coupleable to the user's head; one or more electromagnetic radiation emitters (126, 832, 834) coupled to the head-mounted member (58) and configured to emit light with at least two different wavelengths in inward directions or outwards directions, one or more electromagnetic radiation detectors (126, 828, 830) coupled to the head-mounted member and configured to receive light reflected after encountering a target object; and a controller (844) operatively coupled to the one or more electromagnetic radiation emitters (126, 832, 834) and one or more electromagnetic radiation detectors (126, 828, 830) and configured to cause the one or more electromagnetic radiation emitters to emit pulses of light while also causing the one or more electromagnetic radiation detectors to detect levels of light absorption related to the emitted pulses of light, and to produce a displayable output.

The head-mounted member (58) may comprise frame configured to fit on the user's head, e.g., an eyeglasses frame. The eyeglasses frame may be a binocular eyeglasses frame; alternative embodiments may be monocular. The one or more emitters (126, 832, and 834) may comprise a light source, for example at least one light emitting diode or other electromagnetic radiation emitter, emitting light at multiple wavelengths. The plurality of light sources may be configured to preferably emit at two wavelengths of light, e.g., a first wavelength of about 660 nanometers, and a second wavelength of about 940 nanometers.

In some embodiments, the one or more emitters (126, 832, 834) may be configured to emit light at the respective wavelengths sequentially. In some embodiments, the one or more emitters (126, 832, 834) may be configured to emit light at the respective wavelengths simultaneously. The one or more electromagnetic radiation detectors (126, 828, 830) may comprise a device selected from the group consisting of: a photodiode, a photodetector, and a digital camera sensor. The controller (844) may be further configured to cause the plurality of light emitting diodes to emit a cyclic pattern of first wavelength on, then second wavelength on, then both wavelengths off, such that the one or more electromagnetic radiation detectors detect the first and second wavelengths separately. The controller (844) may be configured to cause the plurality of light emitting diodes to emit a cyclic pattern of first wavelength on, then second wavelength on, then both wavelengths off, in a cyclic pulsing pattern about thirty times per second. The controller (844) may be configured to calculate a ratio of first wavelength light measurement to second wavelength light measurement, and wherein this ratio is converted to an oxygen saturation reading via a lookup table based at least in part upon the Beer-Lambert law.

The controller (844) may be configured to operate the one or more emitters (126, 832, 834) and one or more electromagnetic radiation detectors (126, 828, 830) to function as a head-mounted spectroscope. The controller (844) may be operatively coupled to an optical element (62) coupled to the head-mounted member (58) and viewable by the user, such that the output of the controller (844) that is indicative of a particular characteristic of the target object, such as a material property or tissue property of the target object, may be viewed by the user through the optical element (62).

FIG. 7A is an example light property absorption chart that may be referenced by an absorption database (630, FIG. 6). As depicted, various light source types, such as IR, NIR, or light emitting diodes in the visible spectrum may be optimal for detecting certain tissues and properties within the tissue. For example, pigmented lesions may have noticeable absorption spectrum features between approximately 390 nm and 1110 nm, while bulk tissue may have noticeable absorption spectrum features between approximately 1155 nm and 1915 nm. In another example, blood vessels may produce detectable absorption peaks at between approximately 390 nm and 455 nm, between approximately 525 nm and 610 nm, and/or between approximately 770 nm and 1170 nm. In some embodiments, an absorption ratio or scatter in calibration curve is computed from emitted light to reflected light and applied to the given absorption database (630) such as depicted in FIG. 7A to determine the underlying tissue and/or properties within or determine abnormalities. Moreover, light sources may be selected in order to selectively illuminate tissue with light in a desired wavelength range. For example, in some embodiments a gallium nitride light emitting diode (LED) may emit light having a wavelength between approximately 390 nm and 455 nm, a gallium phosphide LED may emit light having a wavelength between approximately 500 m and 690 nm, a gallium arsenide LED may emit light having a wavelength between approximately 720 nm and 1090 nm, and indium phosphide LED may emit light having a wavelength between approximately 1110 nm and 1905 nm, and a gallium antimonide LED may emit light having a wavelengths between approximately 1925 nm and over 2000 nm.

FIG. 7B depicts potential "overlap" of wavelengths. As depicted, "oxygenated blood" may overlap with "deoxygenated blood" at certain wavelengths, muting the results that a spectroscopic processes may provide. To avoid this potential overlap, in some embodiments, light at a second different wavelength is emitted to provide a second source of light to measure and compare. For example, light may be emitted at a first wavelength range between, e.g., 650 nm and 950 nm, and a second wavelength range between, e.g., 1000 nm and 1350 nm.

Figure 8:
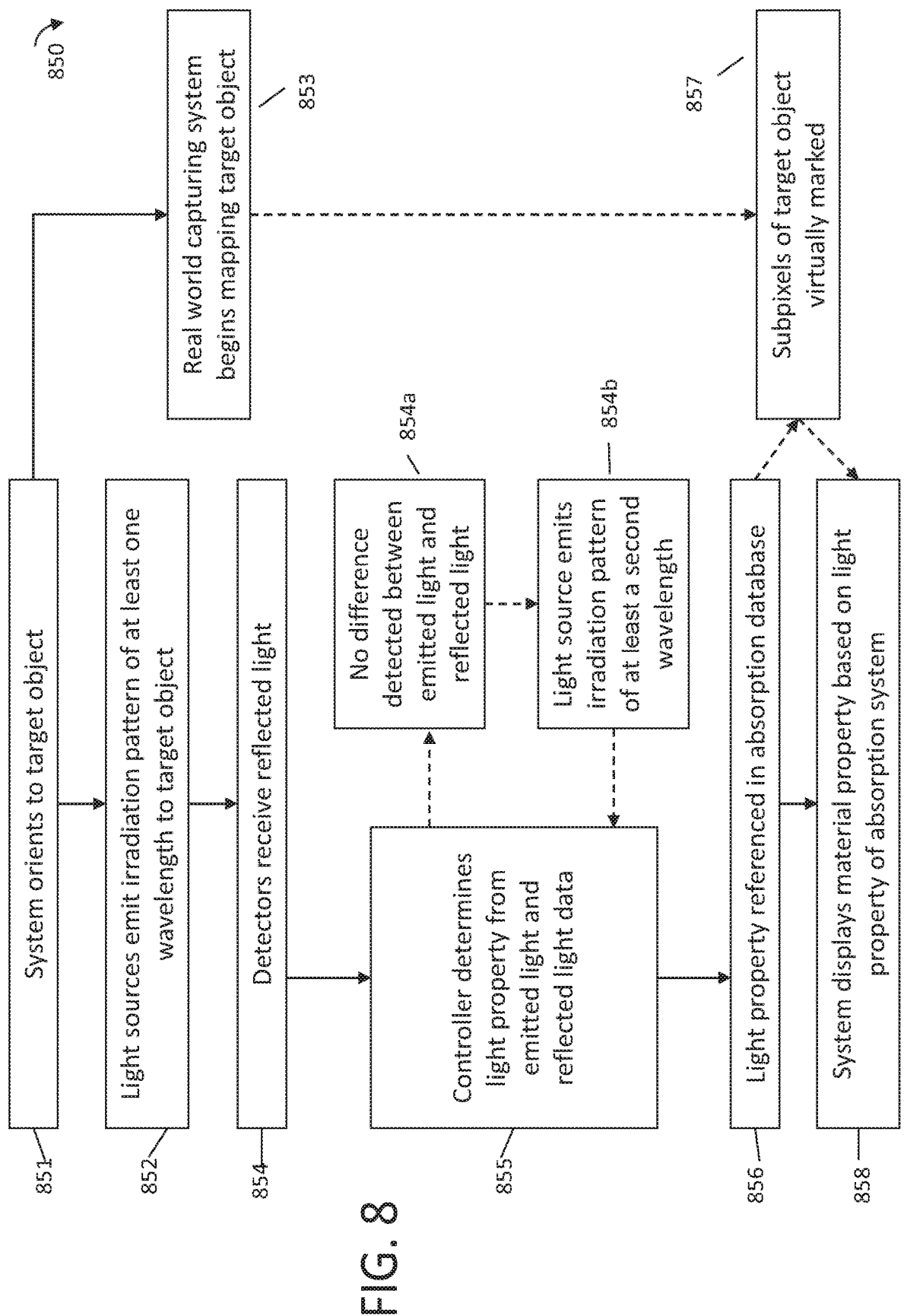
FIG. 8 illustrates a method for identifying materials or material properties through a head-mounted spectroscopy system according to some embodiments.

FIG. 8 illustrates a method (850) for using a wearable AR/VR system featuring spectroscopy components to identify a material or properties within a material. Method (850) begins at (851) with the system orienting light sources to a target object. In some embodiments, the orienting has light sources directed inwards towards the eyes of a user, and may be fixed or scanning the eye such as scanning the retina. In some embodiments, the orienting is by determining an eye gaze or head pose of the user and orienting a light source in substantially the same direction towards a target object within such gaze or pose field of view, or towards feature landmarks or target objects.

In some embodiments, at (852) light sources emit light in an irradiation pattern towards the target object or surface. In some embodiments, the light is pulsed at timed intervals by a timer. In some embodiments, the light source emits light of at least one wavelength and at (854) radiation detectors, such as photo detectors, receive reflected light. In some embodiments, the detectors are also operatively coupled to a timer to indicate if received light was initially pulsed at a certain time to determine changes in light properties upon reflecting on the target object. In some embodiments, (852) begins concurrent with mapping at (853) but this sequence is not necessarily so.

In some embodiments, real world capturing systems may begin to map the target object at (853). In some embodiments, such mapping may include receiving passable world data of the target object. In some embodiments, mapping may include depth sensor analysis of the contours of the target object. In some embodiments, mapping may include building a mesh model of the items within the field of view and referencing them for potential labeling. In some embodiments, the target object is not a specific object within the field of view that may be captured by a depth sensor, but rather is a depth plane within the field of view itself.

In some embodiments, at (855) a controller analyzes the emitted light compared to the received light, such as under the Beer-Lambert law or the optical density relationship (described below) or scatter pattern of a calibration curve. In some embodiments, at (856) the compared light properties are referenced in an absorption database, either locally stored on the system or remotely accessed through the system, to identify a characteristic of the target object such as the material forming or a material property of the target object. In some embodiments, an absorption database may comprise saturation light charts, such as the one depicted in FIG. 4B, or may comprise calibration curves of particular light wavelengths.

In some embodiments, at (854) the radiation detectors do not receive light of different wavelengths than the wavelength of the light emitted at (852), and a controller cannot conduct a spectroscopic analysis. Such an occasion would occur as in FIG. 73, with overlap of wavelengths in certain ranges for oxygenated and deoxygenated blood. In some embodiments, at (854a) no wavelength difference is detected between the emitted light and received light, and substep (854b) initiates by emitting light at another different wavelength than that emitted at (852). The new light emitted and light received information is then delivered to a controller at (855).

In some embodiments, real world cameras may additionally, subsequent to mapping a target object (853) and potentially concurrent with each of (852 through 856), identify subpixels within a field of field indicative of irregularities at (857). For example, in some embodiments, color contrast between pixels is detected during real world capture at (853) and at (857) these pixels are further altered to highlight such contrast as potential unhealthy cells. In some embodiments, real world capture (853) detects irregular lines among pixel clusters and at (857) the pixels bounded by the irregular lines are marked (such as by a virtual color overlay) on a user display.

In some embodiments, method (850) terminates at (858) with the system displaying the tissue or material property of the tissue to the user. In some embodiments, display may comprise a textual label virtually displayed proximate to the target object, an audio label describing the target object as determined from the absorption database (630), or a virtual image of similar tissue or object identified by absorption database (630) juxtaposed proximate to the target object.

In some embodiments, a significant amount of the spectroscopy activity is implemented with software operated by the controller (844), such that an initial task of locating desired targets (e.g., blood vessels, muscle tissue, bone tissue, or other tissue and at a desired depth) is conducted using digital image processing (such as by color, grayscale, and/or intensity thresholding analysis using various filters. Such targeting may be conducted using pattern, shape recognition or texture recognition. Cancerous cells or otherwise irregular cells commonly have irregular borders. A camera system may identify a series of pixels within a camera field of view (such as cameras 124 and field of view 18, 22 of FIG. 5) with an irregular, non-linear pattern and prompt attention to identify such as a border to a potentially unhealthy cell. Alternatively, the software and controller may be configured to use the intensity of the center of the targeted object and the intensity of the surrounding objects/tissue to determine contrast/optical density with the targeted object to determine abnormalities. Such measures may merely be used to identify areas of interest for spectroscopic scan consistent with this disclosure, and not necessarily a means of identifying tissue itself. Further, as previously described with reference to irregular cells (626) in FIG. 6, an augmented reality system may overlay a label or color pattern within the borders of the potentially unhealthy cells to flag them/highlight them against surrounding healthy cells.

In some embodiments, the controller (844) may be utilized to calculate density ratios (contrast) and to calculate the oxygen saturation from the density ratios of various pulse oximetry properties in blood vessels. Vessel optical density ("O.D.") at each of the two or more emitted wavelengths may be calculated using the formula:

$$ODvessel = -\log_{10}(Iv/It)$$

wherein ODvessel is the optical density of the vessel; Iv is the vessel intensity; and It is the surrounding tissue intensity.

Oxygen saturation (also termed "SO2") in a blood vessel may be calculated as a linear ratio of vessel optical densities (OD ratio, or "ODR") at the two wavelengths, such that:

$$SO_2 = ODR = OD_{firstwavelength}/OD_{secondwavelength}$$

In one embodiment, wavelengths of about 570 nm (sensitive to deoxygenated hemoglobin) and about 600 nm (sensitive to oxygenated hemoglobin) may be utilized in vessel oximetry, such that $SO2 = ODR = OD_{600}$ nm/D570 nm; such formula does not account for adjusting the ratio by a calibration coefficient.

The above formulas are merely examples of references for calculating material properties. One of skill in the art will appreciate many other tissue properties and relationships a controller may determine.

It will be appreciated that utilizing the controller (844) to perform calculations and/or make determinations may involve performing calculations locally on a processor within the controller (844). In some other embodiments, performing calculations and/or making determinations with the controller (844) may involve utilizing the controller to interface with external computing resources, e.g., resources in the cloud (46) such as servers (110).

Ambient Light Correction

Figure 9A:
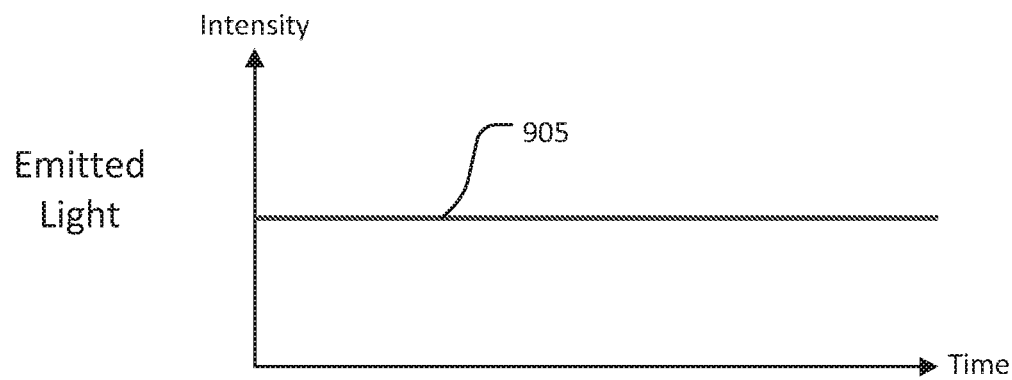
FIGS. 9A-9C are example graphs illustrating the effect of ambient light on spectroscopic measurements in some embodiments.
Figure 9B:
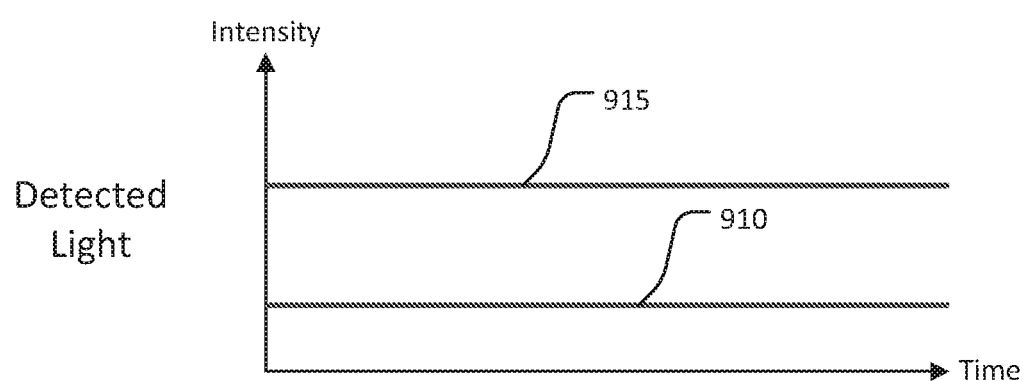
Figure 9C:
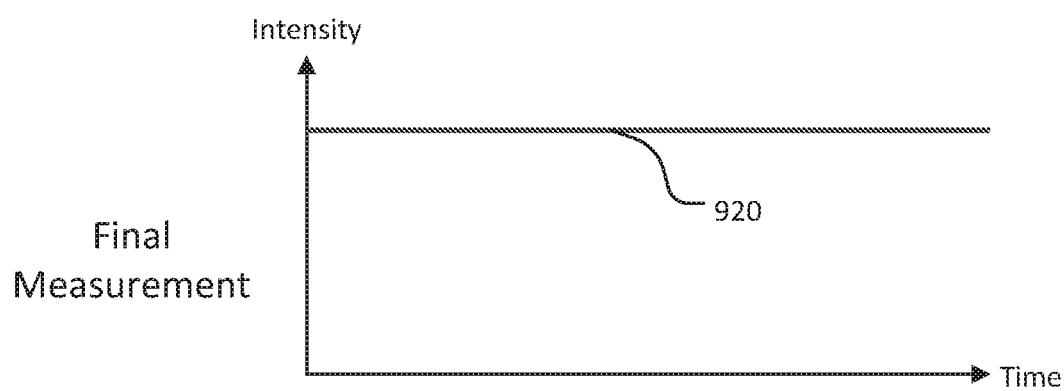

As described above, the presence of ambient light in the environment may complicate the spectroscopic methods described herein. FIGS. 9A-9C illustrate an effect ambient light may have on certain spectroscopic methods. Each of the graphs of FIGS. 9A-9C depicts light intensity over time as the spectroscopic methods disclosed herein are performed.

With reference to FIG. 9A, in some spectroscopy systems, a light source may emit light (905) at a constant or substantially constant intensity. For example, the light (905) of constant intensity may be emitted by any of the inward or outward-facing light sources described herein, such as emitters (126, 832, 834, FIG. 5) or light source (612, FIG. 6). In embodiments described herein in which light is emitted at a plurality of wavelengths, the intensity may correspond to one or more of the plurality of wavelengths.

The graph of FIG. 9B depicts example time-domain functions of constituent components of the light detected at an electromagnetic radiation detector corresponding to the light emissions of FIG. 9A. For example, the light may be detected at any of the inward or outward-facing electromagnetic radiation detectors described herein, such as detectors (126, 828, 830, FIG. 5) or photodetectors (614, FIG. 6). As shown in FIG. 9B, the detected light includes a reflected light component (910) and an ambient light component (915). The reflected light component (910) includes a portion of the emitted light (905) that has been reflected from the surface of a target object, such as the object (620, FIG. 6). Generally, the reflected light component (910) has a lower intensity relative to the emitted light (905), as some of the emitted light (905) may be absorbed or scattered in a different direction by the target object, or may pass by the target object.

The ambient light component (915) may have a constant or variable intensity, and may comprise light emitted from a source other than the light source (126, 832, 834, FIG. 5; 612, FIG. 6). For example, the ambient light component (915) may include light from the environment that has passed by the target object to be incident upon the detector, as well as light from the environment that has been scattered by the surface of the target object. Depending on the particular environment in which the spectroscopic analysis is being performed and/or the material composition of the target object (620), the intensity of the ambient light component (915) may be greater than, equal to, or less than the intensity of the reflected light component (910), and/or may vary over time. Without being bound by theory, the ambient light component (915) may introduce noise into the detection of the reflected light component (910) or may otherwise alter the measurement of that light. With reference to FIG. 9C, this added noise may result in a single measurement of detected light (920), in which it may be difficult to separately identify the reflected light component (910) and the ambient light component (915). For example, both the reflected light component (910) and the ambient light component (915) may include light having similar wavelengths. Thus, with light emission and measurement corresponding to FIGS. 9A-9C, it may be difficult to accurately determine the amount of reflectance or absorbance of the emitted light (905) and associated material properties based on reflectance or absorbance, since ambient light may skew the measurement of the reflected light.

Referring again to FIGS. 5 and 6, an example method of removing ambient light noise using an anti-scatter grid will now be described. In some embodiments, noise caused by ambient light may be reduced and/or removed by including an anti-scatter grid (129, 629) in the head-mounted component (58, FIG. 5) or spectroscopic array (126, FIG. 6). In some embodiments, ambient light may be understood to be similar to scattered light in the sense that the ambient light may propagate to a radiation detector at angles different from reflected light. Consequently, preventing scattered light from reaching the radiation detector may be understood to reduce the contribution of ambient light to measurements by the radiation detector.

With reference to FIGS. 5 and 6, the anti-scatter grid may be located anywhere within the head-mounted component (58, FIG. 5) or spectroscopic array (126, FIG. 6) such that the anti-scatter grid (129, 629) lies along the path of the reflected and ambient light between the target object and the electromagnetic radiation detectors (126, 828, 830, FIG. 5; 614, FIG. 6). In some embodiments, the anti-scatter grid may attenuate incident light that is not parallel to, or within a threshold angle of, the direction of the emitted light (613) and the reflected light (615). In some embodiments, such threshold angle is less than thirty-two degrees, though greater or smaller threshold angles are possible given the desired level of filtering desired. For example, the threshold angle may be less than sixteen degrees, less than forty-eight degrees, less than sixty-four degrees, etc. One of skill in the art will recognize the thirty-two degree threshold as a function of the sixteen degrees corresponding to a bundle of light rays consistent with output light emitting sources. Accordingly, the anti-scatter grid generally allows the emitted and reflected light to pass therethrough with little to no attenuation; much of the scattered light and ambient light may be traveling at relatively larger angles relative to the emitted light (613) and the reflected light (615), and may thus be attenuated at the anti-scatter grid (129, 629). For example, the surfaces of the anti-scatter grid exposed to ambient or reflected light may be coated with or formed of a material that has high levels of light absorption, particularly at the wavelengths relevant for a spectroscopic analysis. Examples of light absorbing materials include VANTABLACK®. Accordingly, the ambient light component of the detected light, as depicted in FIG. 9B, may be substantially reduced, resulting in an absorbance or reflectance measurement that more accurately corresponds to the absorbance or reflectance of the target object (620).

Figure 10A:
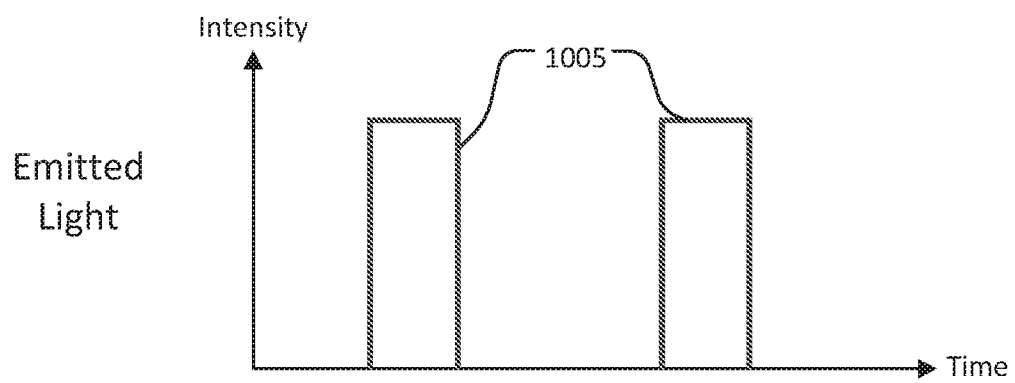
FIGS. 10A-10C are graphs illustrating an example process of correcting for ambient light using time-domain multiplexing according to some embodiments.
Figure 10B:
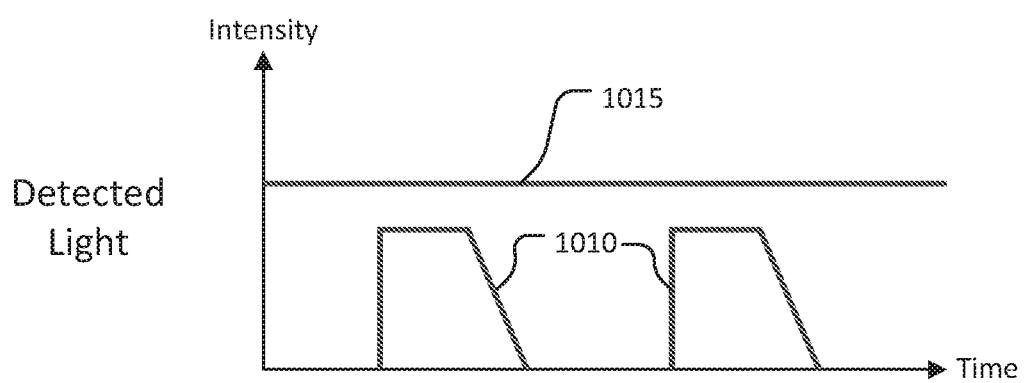
Figure 10C:
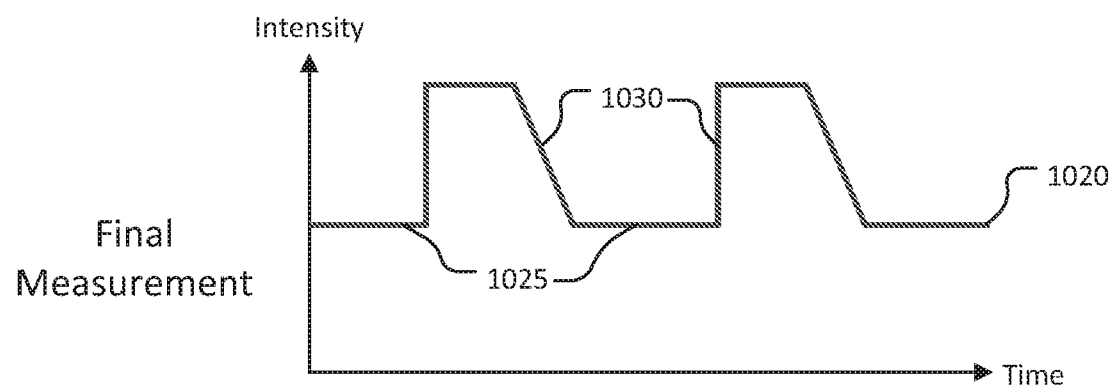

Referring now to FIGS. 10A-10C, an example method of removing ambient light noise based on aspects of the emitted light will now be described. In various embodiments, the emitted light for spectroscopic analysis may be conditioned such that the reflected light detected at the electromagnetic radiation detectors (126, 828, 830, FIG. 5; 614, FIG. 6) may be distinguished from ambient or scattered light. In one example, as shown in FIGS. 10A-10C, the emitted light may be emitted in time-separated pulses (1005). In some embodiments, the pulses (1005) may be separated by a period of no emission, or may be separated by a period of emission at lower intensity relative to the pulses (1005). In some embodiments, the pulses (1005) may be produced by a component such as an optical time-of-flight depth sensor or other component configured to produce pulses of light.

With reference to FIG. 10B, at least a portion of the light emitted in pulses 1005 may be reflected by the target object (620) toward the electromagnetic radiation detectors (126, 828, 830, FIG. 5; 614, FIG. 6) as reflected pulses (1010). It will be appreciated that the shape of the reflected pulses (1010) may be similar to the shape of the emitted pulses (1005). The reflected pulses (1010) may generally be of a lower intensity relative to the emitted pulses 1005, as some of the emitted light may be absorbed at the target object (620) and/or may pass by the target object (620).

Similar to the situation depicted in FIG. 9B, an ambient light component (1015) may have a constant or variable intensity, and may comprise light emitted from a source other than the light source (126, 832, 834, FIG. 5; 612, FIG. 6). For example, the ambient light component (1015) may include light from the environment that has passed by the target object to be incident upon the detector, as well as light from the environment that has been scattered by the surface of the target object. Depending on the particular environment in which the spectroscopic analysis is being performed and/or the material composition of the target object (620), the intensity of the ambient light component (915) may be greater than, equal to, or less than the maximum intensity of the reflected light component (910), and/or may vary overtime. However, the ambient light component (1015) generally will not have a regular pulse pattern similar to the emitted pulses (1005) and reflected pulses (1010).

Thus, as shown in FIG. 10C, the final measurement of detected light (1020) retains a distinguishable ambient light component (1025) and pulses (1030). For example, where the ambient light component (1025) is roughly steady-state, measurements of light levels between the pulses provides a measurement of the intensity of the ambient light component (1025). Accordingly, an intensity and/or time-domain intensity function of the ambient light component (1025) may be calculated. The ambient light component (1025) may then be subtracted from the intensity of the pulses (1030) in the final measurement of detected light (1020) to determine an ambient light-adjusted measurement of reflectance.

In some embodiments, the calculation of the ambient light intensity and adjustment of the intensity of pulses (1030) may be performed at one or more components such as the controller (844) or processor (611) depicted and described elsewhere herein, and/or at any other processing components in communication with the system. Such calculations and/or determinations may be performed locally and/or may involve utilizing local components to interface with external computing resources, e.g., resources in the cloud (46) such as servers (110).

The previously described example of time-domain multiplexing using regular pulses of emitted light is just one example of various methods by which the emitted light may be made more readily distinguishable from the ambient light, relative to a constant output of light. Various other types of conditioned emitted light may equally be used without departing from the spirit or scope of the present disclosure. In various embodiments, the emitted light may be varied in a known manner (e.g., a known property of the light may have a known variance with time), and the detected light may also be expected to vary in a similar manner. Consequently, light that does not vary in this expected manner may be understood to be light coming from another source, e.g., ambient light, and, as such, may be subtracted from the detected light.

In one example, the intensity of the emitted light may vary sinusoidally at a constant frequency, such that a component of the detected light (920, 1020) varying at the same frequency may be identified and isolated to determine an ambient light-adjusted reflectance (with the assumption that the ambient light levels are roughly constant, while the variance of the emitted light intensity with time is known). In another example, frequency and/or amplitude of the emitted light signal may be modulated in a known way, e.g., frequency and/or amplitude may vary with a known dependence upon time. A frequency associated with the emitted light may further be produced by heterodyning. In yet another example, any of various coding schemes may be incorporated into the emitted light, such as a Manchester code, a Hamming code, or the like. In another example, any of various pseudo-random variations may be incorporated into the emitted light signal. The detected light may be correlated with the pseudo-random variations to identify reflected and ambient components of the detected light (920, 1020). In yet another example, the emitted light may be polarized (e.g., using a linear, circular, or elliptical polarization) in a polarization state not expected to be present or prevalent in the ambient and/or scattered light, such that the reflected and ambient components of the measured light may be isolated based on polarization state.

Referring jointly to FIGS. 5, 6, and 9A-10, another example method of correcting for ambient light noise will now be described. In some embodiments, the head-mounted component (58, FIG. 5) or spectroscopic array (126, FIG. 6) includes an ambient light detector (128, FIG. 5; 628, FIG. 6). The ambient light detector (128, 628) may include any one or more of the various types of electromagnetic radiation detectors described here. The ambient light detector (128, 628) may be inward-facing and/or outward-facing, for example, in the direction as emitted light for the spectroscopic analysis. In some embodiments, the ambient light detector (128, 628) may be oriented in the same or similar direction as the electromagnetic radiation detector(s) (126, 828, 830) so as to capture the ambient light in the same general direction as the target object. In similar environments, the ambient light detector (128, 628) a point in a direction different from the target object, thereby providing a measurement of ambient light levels that are independent of light reflected from the target object.

It will be appreciated that the various ambient light level determinations made above provide an ambient light correction which may be applied to measurements of detected reflected light to remove the contribution of ambient light to the detected reflected light measurement. For example, the intensity values of the ambient light may simply be subtracted from the intensity values of the light detected by a radiation detector to arrive at the corrected reflected light measurement. In addition, as described herein, the difference between the intensities of the emitted light and the detected reflected light provide an absorbance measurement for the target object, which may be utilized to determine properties of the object as described herein. Any of the ambient light correction methods described above may be used individually and/or together in any combination. For example, in some embodiments the time-encoding or ambient light detection methods described above may be implemented in systems that additionally include an anti-scatter grid.

FIG. 11 illustrates a method (1100) for using a wearable AR/VR system featuring spectroscopy components to identify a material or properties within a material, including the ambient light correction methods described herein. In some embodiments, the method may optionally begin at (1102) with the system detecting ambient light in the vicinity of a target object to be imaged. As described above, the system may detect the ambient light at an ambient light sensor and/or any electromagnetic radiation detectors of the system. For example, the system may take 1, 2, 5, 10, or more discrete measurements of the ambient light, and/or may continuously measure the ambient light while the light sources of the system are not emitting an irradiation pattern. Measurements of the ambient light provides an ambient light correction, which may be later applied to correct measurements of reflected light. After the optional ambient light detection at (1102), the method (1100) continues as described above with reference to FIG. 8.

The various time-domain encoding methods described above with reference to FIGS. 10A-10C may be incorporated at (1110), in which the controller determines one or more properties of light from the emitted light and the reflected light data. For example, at (1110), the system may detect light travelling from the direction of the target object and compare the detected light to the conditioned light emitted at (1106) to identify any pattern, pulse, encoding, polarization, or other identifying characteristic of the emitted light, as described herein. In some embodiments, at (1110), the display system may also apply the ambient light correction to adjust measurements of reflected light obtained at (1108) before making a final determination of the light property.

Accordingly, with the enhanced ambient light correction methods described herein, the system at (1108*a*) may be able to more effectively determine whether there is a difference between the emitted light and the reflected light. Similarly, the system at (1110) may be able to more accurately determine an absorption or reflection characteristic of the target object, thus enhancing the accuracy of the reference to the absorption database at (1112) and determination of material property for display at (1116).

Computer Vision

As discussed above, the spectroscopy system may be configured to detect objects in or features (e.g. properties) of objects in the environment surrounding the user. In some embodiments, objects or properties of objects present in the environment may be detected using computer vision techniques. For example, as disclosed herein, the spectroscopy system's forward-facing camera may be configured to image an object and the system may be configured to perform image analysis on the images to determine the presence of features on the objects. The system may analyze the images, absorption determinations, and/or reflected and/or scattered light measurements acquired by the outward-facing imaging system to object recognition, object pose estimation, learning, indexing, motion estimation, or image restoration, etc. One or more computer vision algorithms may be selected as appropriate and used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

As discussed herein, the objects or features (including properties) of objects may be detected based on one or more criteria (e.g., absorbance, light reflection, and/or light scattering at one or more wavelengths). When the spectroscopy system detects the presence or absence of the criteria in the ambient environment using a computer vision algorithm or using data received from one or more sensor assemblies (which may or may not be part of the spectroscopy system), the spectroscopy system may then signal the presence of the object or feature.

One or more of these computer vision techniques may also be used together with data acquired from other environmental sensors (such as, e.g., microphone, GPS sensor) to detect and determine various properties of the objects detected by the sensors.

Machine Learning

A variety of machine learning algorithms may be used to learn to identify the presence of objects or features of objects. Once trained, the machine learning algorithms may be stored by the spectroscopy system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of absorbance, light reflection, and/or light scattering values obtained at one or more wavelengths), conditional situations, or other variations. In some embodiments, the spectroscopy system may be configured to utilize a plurality of techniques to generate models for analysis of the aggregated data. Other techniques may include using pre-defined thresholds or data values.

The criteria for detecting an object or feature of an object may include one or more threshold conditions. If the analysis of the data acquired by a sensor (e.g., a camera or photodetector) indicates that a threshold condition is passed, the spectroscopy system may provide a signal indicating the detection the presence of the object in the ambient environment. The threshold condition may involve a quantitative and/or qualitative measure. For example, the threshold condition may include a score or a percentage associated with the likelihood of the object and/or feature being present. The spectroscopy system may compare the score calculated from the sensor's data with the threshold score. If the score is higher than the threshold level, the spectroscopy system may signal detection of the presence of an object or object feature. In some other embodiments, the spectroscopy system may signal the absence of the object or feature if the score is lower than the threshold.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. A code module may be compiled and linked into an executable program, installed in a dynamic link library, or may be written in an interpreted programming language. In some embodiments, particular operations and methods may be performed by circuitry that is specific to a given function. In some embodiments, the code modules may be executed by hardware in the controller (844) (FIG. 5) and/or in the cloud (46) (e.g., servers (110)).

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (70, FIG. 2C), the remote processing module (72, FIG. 2D), and remote data repository (74, FIG. 2D). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element-irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A wearable spectroscopy system comprising:
  a head-mounted display system removably mountable on a user's head;
  one or more head-mounted light sources coupled to the head-mounted display system and configured to emit light in an irradiated field of view;
  one or more head-mounted electromagnetic radiation detectors coupled to the head-mounted display system and configured to receive reflected light from a target object irradiated by the one or more light sources within the irradiated field of view;
  one or more processors; and
  one or more computer storage media storing instructions that, when executed by the one or more processors, cause the system to perform operations comprising:
    causing the one or more light sources to emit light;
    causing the one or more electromagnetic radiation detectors to detect light from the irradiated field of view including the target object;
    determining an ambient light correction by detecting ambient light levels;
    applying the ambient light correction to the detected light to determine levels of light absorption related to the emitted light and reflected light from the target object;
    identifying, based on the levels of light absorption, a characteristic of the target object; and
    displaying an output associated with the characteristic of the target object to the user on the head-mounted display system.

2. The system of claim 1, further comprising an absorption database of light absorption properties of a plurality of materials.

3. The system of claim 1, wherein the ambient light correction comprises one or more of: an ambient light intensity value, an average of a plurality of ambient light intensity values, a median of a plurality of ambient light intensity values, and a time-domain ambient light intensity function.

4. The system of claim 1, further comprising at least one eye tracking camera configured to detect a gaze of the user, wherein the irradiated field of view is substantially in the same direction as the detected gaze.

5. The system of claim 1, wherein the one or more electromagnetic radiation detectors are further configured to detect the ambient light levels.

6. The system of claim 1, further comprising an ambient light detector coupled to the head-mounted display system and configured to capture ambient light not emitted by the one or more light sources, the ambient light including one or more wavelengths emitted by the one or more light sources.

7. The system of claim 6, wherein the ambient light detector comprises at least one of a photodiode, a photodetector, and a digital camera sensor.

8. The system of claim 6, wherein the instructions, when executed by the one or more processors, further cause system to perform operations comprising:
  causing the ambient light detector to detect light while the one or more light sources are not emitting light; and
  determining the ambient light correction based at least in part on the light detected by the ambient light detector.

9. The system of claim 1, further comprising an anti-scatter grid coupled to the head-mounted display system between the target object and the one or more electromagnetic radiation detectors, the anti-scatter grid aligned to attenuate at least a portion of scattered light and ambient light incident upon the anti-scatter grid.

10. The system of claim 9, wherein the anti-scatter grid is further disposed between the target object and a detector for detecting ambient light levels.

11. The system of claim 1, wherein the one or more light sources are configured to emit the light in a series of time-separated pulses, and wherein the instructions, when executed by the one or more processors, further cause the system to perform operations comprising:
  identifying time-separated pulses of reflected light corresponding to the time-separated pulses emitted by the one or more light sources; and
  determining the ambient light correction based at least in part on an intensity of light detected at the one or more electromagnetic radiation detectors between the time-separated pulses of reflected light.

12. The system of claim 11, wherein the time-separated pulses of reflected light are detected at the one or more electromagnetic radiation detectors.

13. The system of claim 1, wherein the one or more electromagnetic radiation detectors comprises at least one of a photodiode and a photodetector.

14. The system of claim 1, wherein the one or more electromagnetic radiation detectors comprises a digital image sensor.

15. The system of claim 1, further comprising an inertial measurement unit positional system.

16. The system of claim 15, wherein the inertial measurement unit positional system determines a pose orientation of the user's head.

17. The system of claim 16, wherein the irradiated field of view is at least as wide as the pose orientation.

18. The system of claim 1, wherein the head-mounted display system comprises a waveguide stack configured to output light with selectively variable levels of wavefront divergence.

19. A wearable spectroscopy system comprising:
- a head-mounted display removably mountable on a user's head;
- one or more head-mounted light sources coupled to the head-mounted display system and configured to emit light in an irradiated field of view;
- one or more head-mounted electromagnetic radiation detectors coupled to the head-mounted display system and configured to receive reflected light from a target object irradiated by the one or more light sources within the irradiated field of view;
- one or more processors; and
- one or more computer storage media storing instructions that, when executed by the one or more processors, cause the system to perform operations comprising:
  - detecting ambient light of a first wavelength within the irradiated field of view;
  - emitting light of the first wavelength toward the target object;
  - detecting light of the first wavelength reflected by the target object;
  - subtracting an intensity of the detected ambient light of the first wavelength from an intensity of the detected light reflected by the target object to calculate a level of light absorption related to the emitted light and the reflected light from the target object;
  - identifying, based on an absorption database of light absorption properties of a plurality of materials, a material characteristic of the target object; and
  - displaying, to the user, an output associated with the material characteristic.

20. A wearable spectroscopy system comprising:
- a head-mounted display removably mountable on a user's head;
- one or more head-mounted light sources coupled to the head-mounted display system and configured to emit light in an irradiated field of view;
- one or more head-mounted electromagnetic radiation detectors coupled to the head-mounted display system and configured to receive reflected light from a target object irradiated by the one or more light sources within the irradiated field of view;
- one or more processors; and
- one or more computer storage media storing instructions that, when executed by the one or more processors, cause the system to perform operations comprising:
  - emitting light of a first wavelength in an irradiated field of view, the light comprising a time-encoded variation;
  - detecting light of the first wavelength reflected from a target object within the irradiated field of view;
  - identifying, based at least in part on the detected light and the time-encoded variation, an ambient light component of the detected light and a reflected component of the detected light;
  - identifying, based at least in part on the reflected component and an absorption database of light absorption properties of at least one material, a material characteristic of the target object; and
  - displaying, to the user, an output associated with the material characteristic.

* * * * *